(12) United States Patent
Etling et al.

(10) Patent No.: US 10,578,146 B2
(45) Date of Patent: Mar. 3, 2020

(54) SEAL SYSTEM AND METHOD

(71) Applicant: The Boeing Company, Chicago, IL (US)

(72) Inventors: Keith A. Etling, Shiloh, IL (US); Craig A. Blackburn, Chesterfield, MO (US); Jennifer R. Green, Olivette, MO (US)

(73) Assignee: The Boeing Company, Chicago, IL (US)

( * ) Notice: Subject to any disclaimer, the term of this patent is extended or adjusted under 35 U.S.C. 154(b) by 176 days.

(21) Appl. No.: 15/822,739

(22) Filed: Nov. 27, 2017

(65) Prior Publication Data

US 2019/0162225 A1    May 30, 2019

(51) Int. Cl.
| | |
|---|---|
| *F16B 37/14* | (2006.01) |
| *B64C 1/14* | (2006.01) |
| *F16B 21/07* | (2006.01) |
| *F16B 21/18* | (2006.01) |
| *F16B 33/00* | (2006.01) |

(52) U.S. Cl.
CPC .......... *F16B 37/14* (2013.01); *B64C 1/1446* (2013.01); *F16B 21/073* (2013.01); *F16B 21/183* (2013.01); *F16B 33/004* (2013.01)

(58) Field of Classification Search
CPC .............. F16B 23/0007; F16B 23/0061; F16B 23/0069; F16B 23/0076; F16B 31/02; F16B 37/14; F16B 41/005; Y10S 411/91
USPC .......... 411/372.5, 372.6, 373, 542; 52/784.1; 244/131; 403/326; 29/889.2
See application file for complete search history.

(56) References Cited

U.S. PATENT DOCUMENTS

| | | | | | |
|---|---|---|---|---|---|
| 36,635 | A | * | 10/1862 | Bailey | F16B 37/14 411/373 |
| 3,618,444 | A | * | 11/1971 | Kay et al. | F16B 33/004 411/373 |
| 4,884,932 | A | * | 12/1989 | Meyer | E04D 3/3603 411/373 |
| 5,014,934 | A | * | 5/1991 | McClaflin | B64C 1/12 244/129.4 |
| 5,031,262 | A | * | 7/1991 | Baritz | B21G 5/00 29/505 |
| 8,210,785 | B1 | * | 7/2012 | Gager | E03D 11/16 411/338 |
| 8,443,575 | B1 | | 5/2013 | Tanner | |

\* cited by examiner

*Primary Examiner* — Roberta S Delisle

(57) ABSTRACT

A seal assembly includes a seal body having a seal bottom surface and a plurality of seal cavities spaced along a lengthwise direction of the seal body. The seal cavities are each open to the seal bottom surface via a respective cavity opening. The seal assembly further includes a plurality of locking rings configured to be captured respectively within a corresponding plurality of the seal cavities. Each one of the locking rings includes a ring body having a ring inner perimeter that is externally accessible via the cavity opening when the locking ring is captured within one of the seal cavities. The ring inner perimeter is configured to engage a locking ring engagement portion of a fastener head of a seal-engaging fastener installed in a structure.

21 Claims, 23 Drawing Sheets

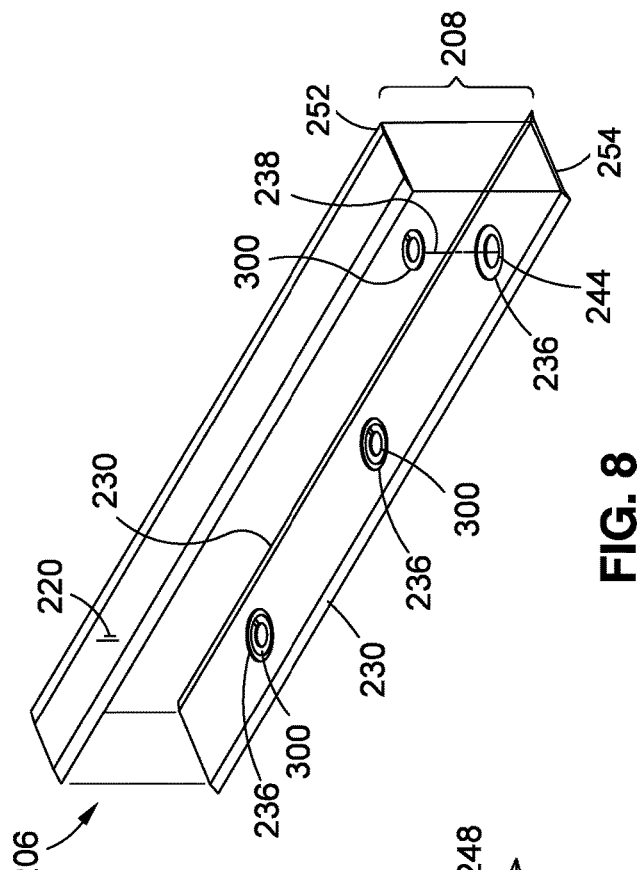
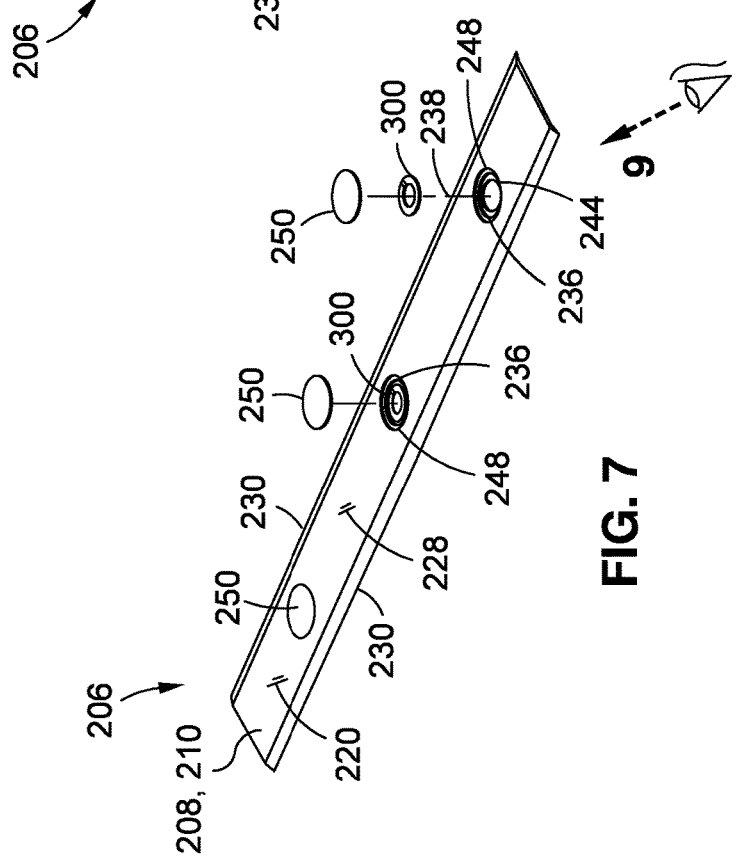
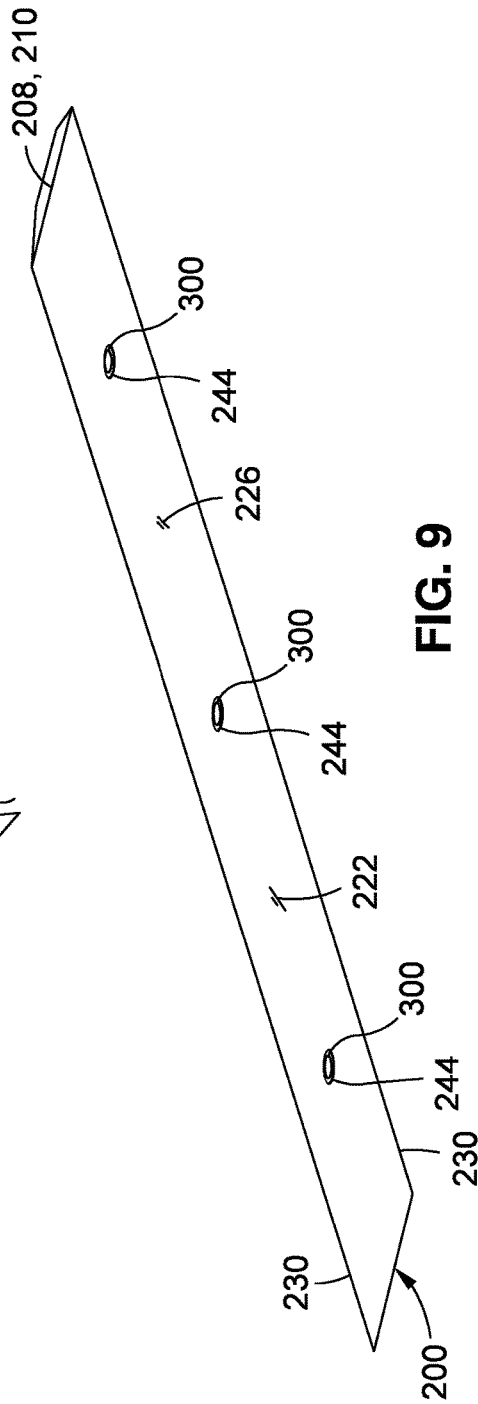

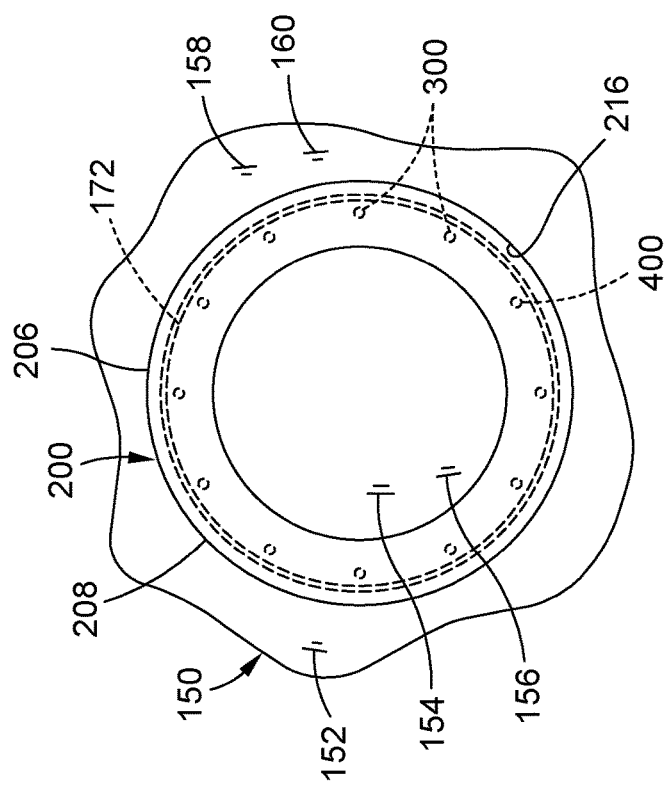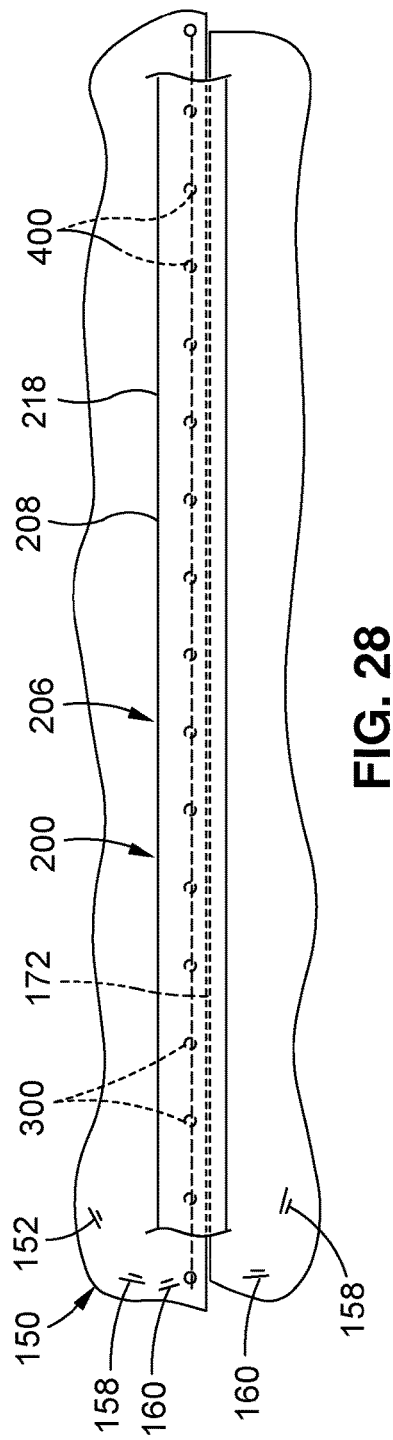

SEAL SYSTEM AND METHOD

FIELD

The present disclosure relates generally to seals for structures and, more particularly, to a seal system and method for covering fasteners installed in a structure.

BACKGROUND

An aircraft may include multiple access panels at different locations on the aircraft exterior for providing access to internal systems that require monitoring or maintenance. Such access panels are typically secured to the aircraft using fasteners installed in mounting holes extending around a perimeter of the access panel. The fasteners heads are typically exposed to air flowing over the aircraft. The air flowing over the exposed fastener heads generates aerodynamic drag that detracts from aircraft performance. In addition, a gap between the access panel and the skin typically extends around the panel perimeter which adds to the aerodynamic drag.

As can be seen, there exists a need in the art for system and method for covering fastener heads and gaps associated with access panels, and which may be implemented on other types of structures having exposed fastener heads.

SUMMARY

The above-noted needs associated with covering fastener heads are specifically addressed by the present disclosure which provides a seal assembly including a seal body having a seal bottom surface and a plurality of seal cavities spaced along a lengthwise direction of the seal body. The seal cavities are each open to the seal bottom surface via a cavity opening. The seal assembly further includes a plurality of locking rings configured to be captured respectively within a corresponding plurality of the seal cavities. Each one of the locking rings includes a ring body having a ring inner perimeter that is externally accessible via the cavity opening when the locking ring is captured within one of the seal cavities. The ring inner perimeter is configured to engage a locking ring engagement portion of a fastener head of a seal-engaging fastener installed in a structure having a structural surface.

Also disclosed is a seal system including a plurality of seal-engaging fasteners and a seal assembly. The seal-engaging fasteners are configured to be installed in mounting holes in a structure having a structural surface. Each one of the seal-engaging fasteners includes a fastener head having a locking ring engagement portion. The seal assembly includes a seal body and a plurality of locking rings. The seal body has a seal bottom surface and a plurality of seal cavities spaced along a lengthwise direction of the seal body. The seal cavities are each open to the seal bottom surface via a cavity opening. The plurality of locking rings are configured to be captured respectively within a corresponding plurality of the seal cavities. Each one of the locking rings includes a ring body having a ring inner perimeter externally accessible via the cavity opening when the locking ring is captured within one of the seal cavities. The ring inner perimeter of each one of the locking rings is configured to engage the locking ring engagement portion of one of the fastener heads for attaching the seal assembly to the seal-engaging fasteners.

In addition, disclosed is a method of sealing a structure. The method includes positioning a seal assembly over a plurality of seal-engaging fasteners installed in mounting holes of a structure having a structural surface. The seal assembly includes a plurality of locking rings captured in a corresponding plurality of seal cavities formed in a seal body of the seal assembly. The method additionally includes engaging the plurality of locking rings to a corresponding plurality of locking ring engagement portions formed on fastener heads of the seal-engaging fasteners for attaching the seal summary to the structure The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 7 is a top-down perspective view of a portion of the seal body of FIG. 6 and illustrating a plurality of seal cutouts formed in the seal top surface for covering seal cavities after the installation of a locking ring in each seal cavity;

FIG. 8 is a top-down perspective view of a further example of a seal body comprised of a lower portion containing seal cavities and an upper portion configured to be bonded to the lower portion for capturing locking rings within the seal cavities;

FIG. 9 is a bottom-up perspective view of the portion of the seal body of FIG. 6 and illustrating a plurality of cavity openings each exposing a portion of the locking ring contained within each seal cavity;

FIG. 10 is a sectional view of an example of the seal assembly of FIG. 6 comprising the seal body and a locking ring captured within a seal cavity;

FIG. 11 is a sectional view of an example of a seal body in an uninstalled state and illustrating opposing seal side edges located at a side edge drop distance below the level of the seal bottom surface;

FIG. 27 is a plan view of an example of a seal body having a closed-loop shape;

FIG. 28 is a plan view of an example of a seal body having a non-closed-loop shape;

DETAILED DESCRIPTION

Figure 1:
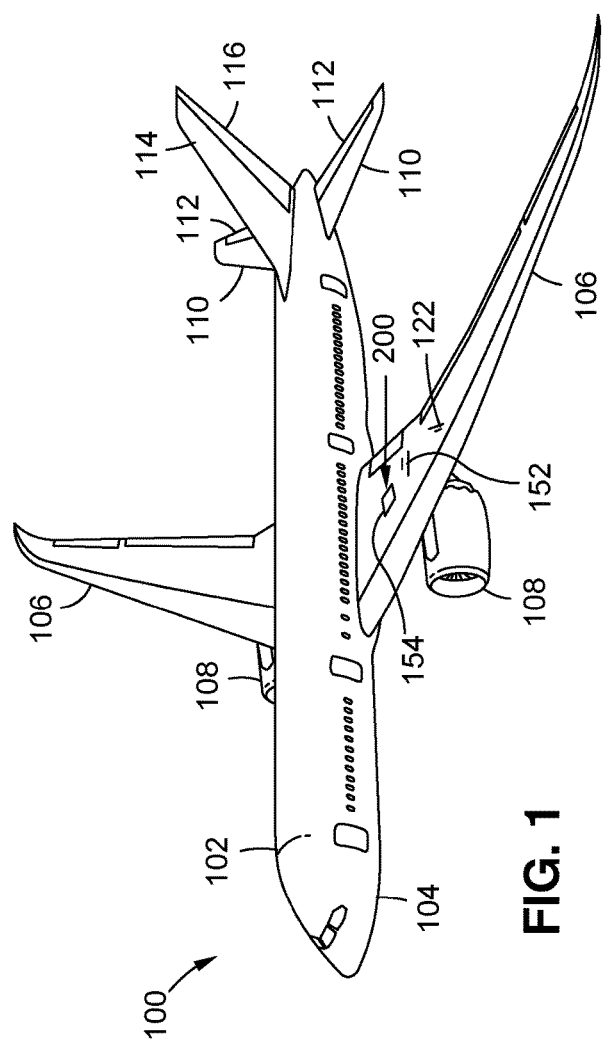
FIG. 1 is a perspective view of an aircraft.

Referring now to the drawings wherein the showings are for purposes of illustrating preferred and various embodiments of the disclosure, shown in FIG. 1 is a perspective view of an aircraft 100 that may include one or more seal systems 200 (e.g., FIG. 4) as disclosed herein. The aircraft 100 includes a fuselage 104 having a forward end and an aft end. The aft end includes an empennage having a horizontal tail and a vertical tail. The horizontal tail may include one or more horizontal stabilizers 110 each having an elevator 112. The vertical tail includes a vertical stabilizer 114 and a rudder 116. The aircraft 100 further includes a pair of wings 106 extending outwardly from the fuselage 104, and may include one or more propulsion units 108.

Figure 2:
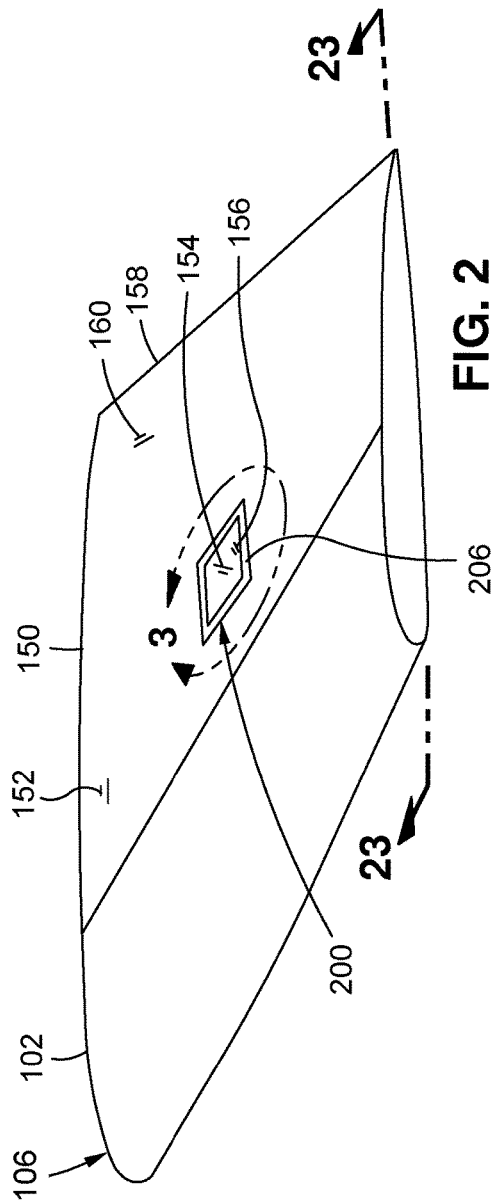
FIG. 2 is a perspective view of a portion of an aircraft wing having an access panel installed on the wing upper surface.

FIG. 2 shows a portion of an aircraft wing 106 having the presently-disclosed seal assembly 206 installed on an access panel 154 located on a wing upper surface. The access panel 154 may cover an opening (not shown) formed in a skin panel 158 of the wing upper surface. The seal assembly 206 may extend around a panel perimeter 178 (FIG. 3) of the access panel 154. The seal assembly 206 covers the fasteners (not shown) securing the access panel 154 to the skin panel 158 via a doubler 168 (FIG. 4). The seal assembly 206 may additionally cover a panel gap 172 (FIG. 3) extending around the panel perimeter 178 of the access panel 154.

Figure 3:
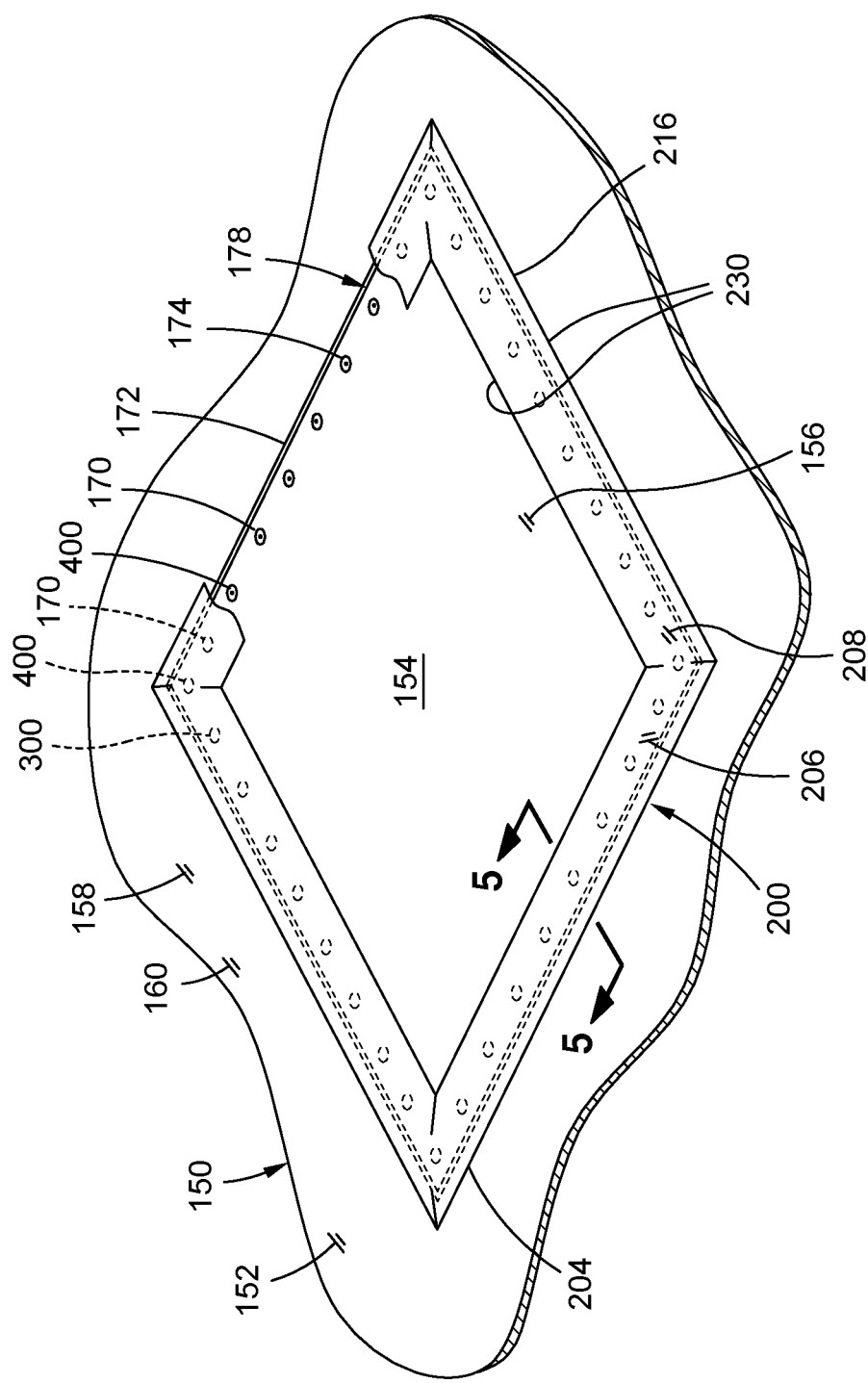
FIG. 3 is a magnified view of the access panel installation of FIG. 2 and illustrating a seal assembly covering fasteners for securing the access panel to the skin panel of the wing.
Figure 4:
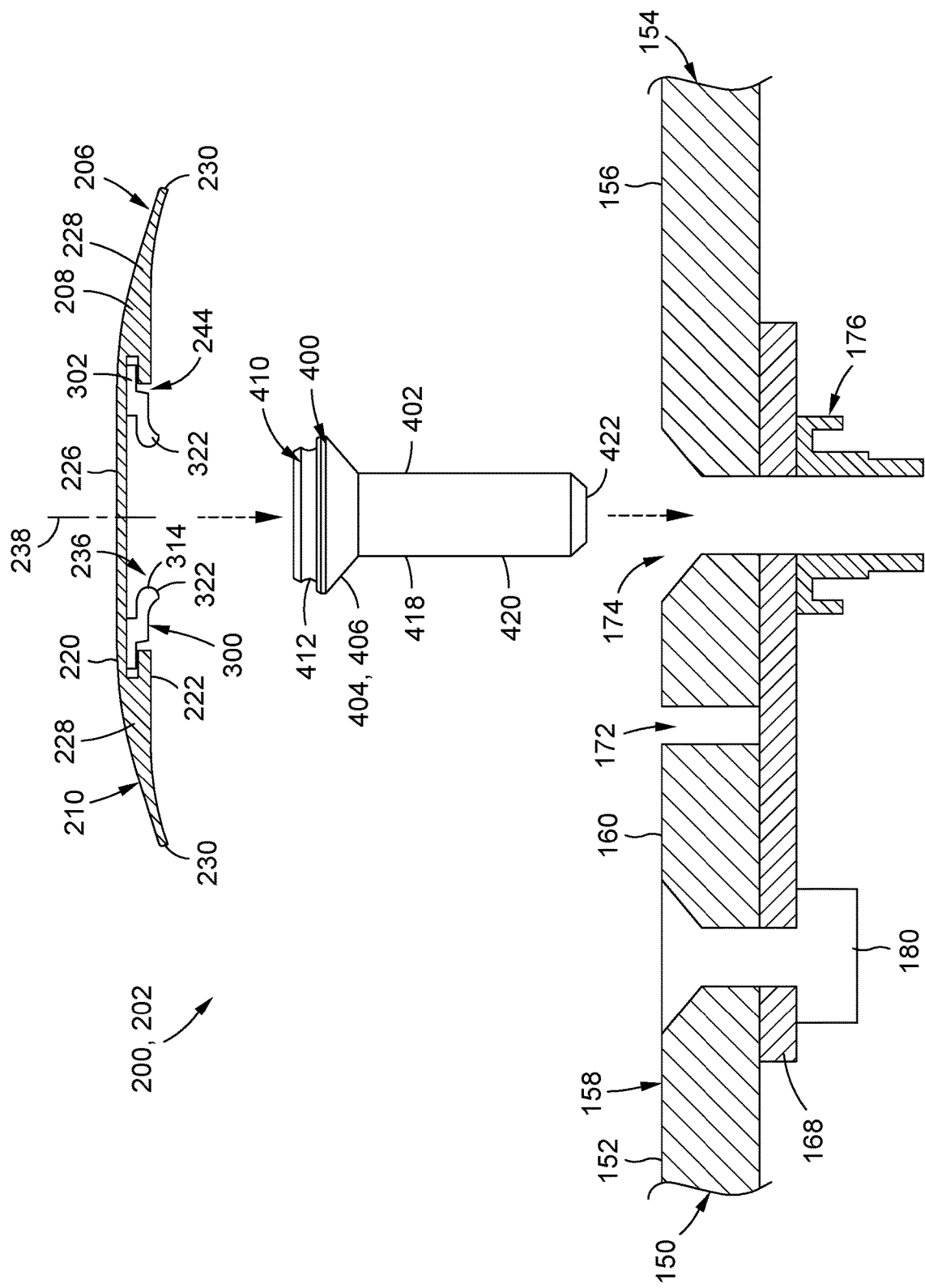
FIG. 4 is an exploded sectional view of a seal installation of the access panel of FIG. 4 and illustrating a seal assembly in an uninstalled state and further illustrating a seal-engaging fastener for securing the seal assembly to the structure and attaching the access panel to an internal doubler.

FIG. 3 is a magnified view of the seal assembly 206 covering the fasteners securing the access panel 154 to the skin panel 158 of the wing 106 (FIG. 1). As described in greater detail below, the seal assembly 206 is configured to be removably attached to the fastener heads 404 (FIG. 4) of a plurality of seal-engaging fasteners 400 installed in a structure 150. In addition to covering the seal-engaging fasteners 400, the seal assembly 206 may also cover one or more standard fasteners 170 and may additionally cover a panel gap 172 located adjacent to the seal-engaging fasteners 400 to which the seal assembly 206 is attached.

The presently-disclosed seal system 200 may be installed on any one of a variety of different types of aircraft structures and is not limited to installation on an access panel 154 of a wing 106. For example, the seal system 200 may be installed at any location on a fuselage 104 (FIG. 1), on a propulsion unit 108 (FIG. 1), on an airfoil such as a horizontal tail or a vertical tail, or on a control surface such as a flap, an aileron, a flaperon, or a leading edge device. The seal system 200 may be installed on structures 150 constructed of any one of a variety of different types of materials including structures 150 formed of metallic material such as aluminum, titanium, or steel, and/or structures 150 formed of non-metallic material such as fiber-reinforced polymer matrix material (e.g., carbon fiber/epoxy, etc.) or other composite materials. Although described in the context of an aircraft 100, the presently-disclosed seal system 200 and method may be implemented on any type of vehicle. Further in this regard, the seal system 200 and method may be implemented on any type of non-vehicular application (not shown) including stationary structures.

In FIG. 3, the seal-engaging fasteners 400 to which the seal assembly 206 is attached may replace one or more standard fasteners 170 that may be included with the structure 150. In the present disclosure, a standard fastener 170 may be described as a fastener that is unmodified for engagement with the presently-disclosed seal assembly 206. In FIG. 3, the access panel 154 is shown attached to the skin panel 158 using alternating seal-engaging fasteners 400 and standard fasteners 170. The seal assembly 206 includes a seal body 208 containing a plurality of spaced-apart locking rings 300 (FIG. 4) configured to be quickly and easily engaged to the fastener heads 404 of a corresponding plurality of seal-engaging fasteners 400 in a manner such that the seal assembly 206 covers the fastener heads 404 of the seal-engaging fasteners 400. Although the seal system 200 is shown attached to seal-engaging fasteners 400 of an access panel 154, the seal system 200 may be removably attached to seal-engaging fasteners 400 installed at any location on a structure 150. For example, a seal system 200 may be removably attached to seal-engaging fasteners 400 installed in a manufacturing joint (not shown) between two adjacent skin panels 158 (FIG. 28).

Referring to FIG. 4, shown is an exploded view of the seal system 200 in an uninstalled state 202 (i.e., a non-stressed state) above an access panel 154. The seal system 200 includes the seal assembly 206 and a plurality of seal-engaging fasteners 400. The seal assembly 206 includes the seal body 208 and a plurality of locking rings 300. The seal body 208 has a seal top surface 220, a seal bottom surface 222, a seal center portion 226, and opposing seal side portions 228 each having a seal side edge 230 extending along a lengthwise direction of the seal body 208. The seal body 208 has a plurality of seal cavities 236 located at spaced intervals along a lengthwise direction of the seal body 208. As shown in FIG. 3, the seal cavities 236 may be spaced apart at a distance corresponding to the spacing between the seal-engaging fasteners 400 to which the seal assembly 206 is to be attached. The spacing distance between the seal-engaging fasteners 400 may correspond to the spacing distance between mounting holes 174 formed in a row in the structure 150. Each one of the seal cavities 236 is open to the seal bottom surface 222 via a cavity opening 244.

The plurality of locking rings 300 of the seal assembly 206 are configured to be captured within a corresponding plurality of the seal cavities 236 in the seal body 208. The plurality of locking rings 300 are configured to be removably attached to a corresponding plurality of seal-engaging fasteners 400 installed in a structure 150. Each locking ring 300 includes a ring body 302 having a ring inner perimeter 314. Each locking ring 300 is configured such that the ring inner perimeter 314 is externally accessible via the cavity opening 244 when the locking ring 300 is captured within the seal cavity 236. The ring body 302 is configured to radially expand as the locking ring 300 is axially moved over the locking ring engagement portion 410 of the fastener head 404 of one of the seal-engaging fasteners 400 until the ring inner perimeter 314 radially contracts into seated engagement (FIG. 5) within the locking ring engagement portion 410. As described in greater detail below, each ring body 302 may include a radial gap 316 (FIG. 14) allowing the ring body 302 and ring inner perimeter 314 to radially expand and contract In FIG. 4, each seal-engaging fastener 400 may be inserted into a mounting hole 174 extending through the access panel 154 and through an internal doubler 168. The seal-engaging fastener 400 may be threadably engaged to a threaded receptacle 176. For example, the threaded receptacle 176 may be a nutplate that is fixedly coupled to the doubler 168. The doubler 168 may be fixedly coupled to an inner surface of the skin panel 158 using fasteners such as bolts or rivets 180, and/or the doubler 168 may be adhesively bonded (not shown) to the inner surface of the skin panel 158.

Figure 5:
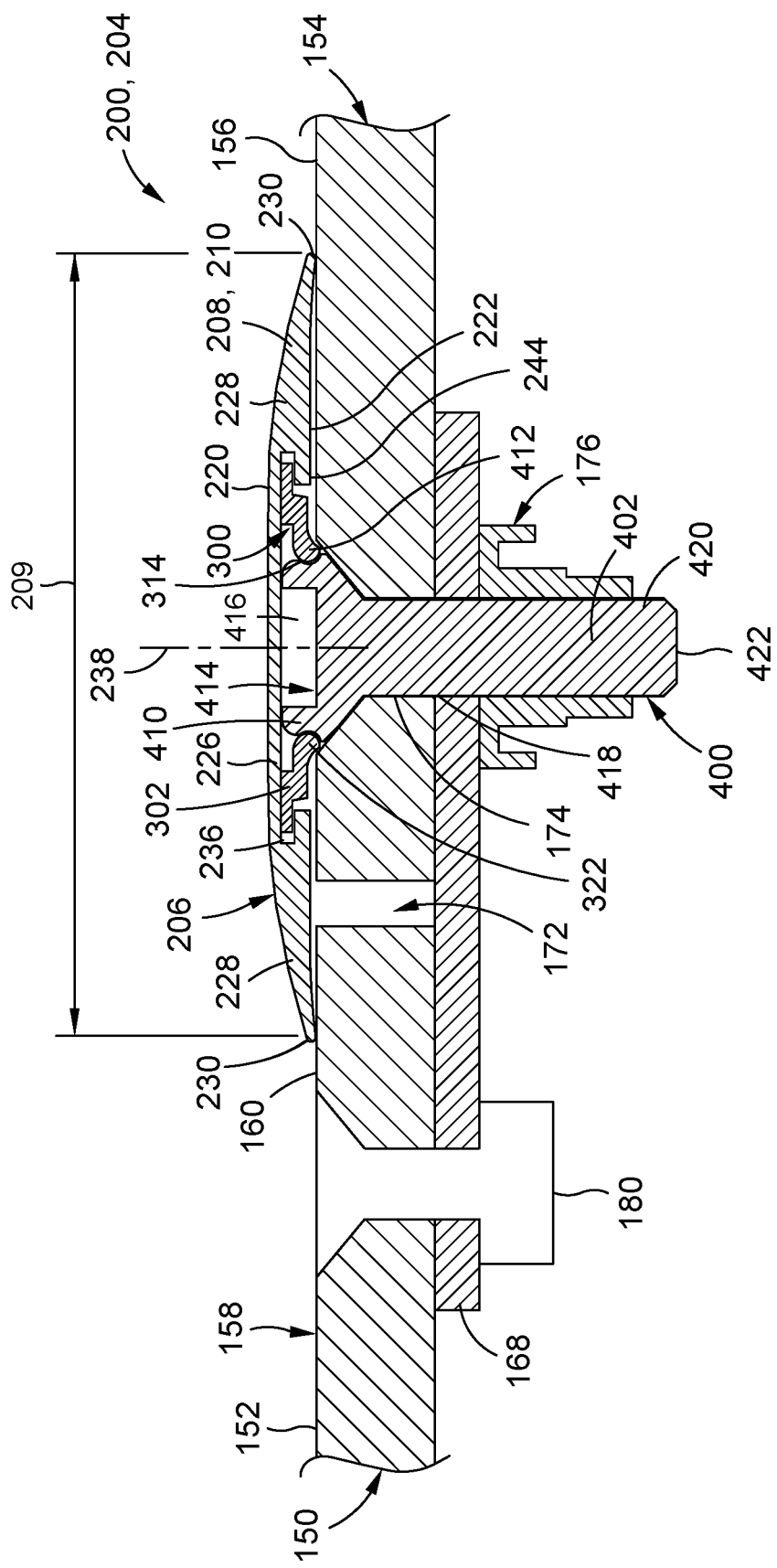
FIG. 5 is a sectional view of the seal installation of FIG. 4 showing the seal assembly in an installed state and illustrating the seal body engaged to the seal-engaging fastener via a locking ring captured within the seal body.

FIG. 5 shows the seal assembly 206 in an installed state 204 in which the seal assembly 206 is attached to a plurality of seal-engaging fasteners 400 via the locking rings 300. The seal assembly 206 is configured to be quickly and easily attached to a plurality of seal-engaging fasteners 400 by pressing each locking ring 300 of the seal assembly 206 onto a fastener head 404 and into engagement with a locking ring engagement portion 410 of a seal-engaging fastener 400. Each locking ring 300 may be pressed into seated engagement with a locking ring engagement portion 410 of a seal-engaging fastener 400 by applying force onto the seal top surface 220 at the location of the locking ring 300. For example, force may be manually applied to the seal top surface 220 using a user's thumb, one or more fingers, or hand. The seal system 200 may be configured to allow for seated engagement of the locking ring 300 to a locking ring engagement portion 410 using a force of not greater than approximately 30 pounds and, more preferably, a force of approximately 15-20 pounds to allow for manual attachment and removal of the seal body 208 from the structure 150. However, a seal system 200 may be configured to require a force greater than 30 pounds for attachment and removal of the seal assembly 206 from the seal-engaging fasteners 400. The locking ring 300 and the locking ring engagement portion 410 may be configured such that approximately the same amount of force is required to both engage and disengage the locking ring 300 from the locking ring engagement portion 410.

In FIGS. 4-5, the seal body 208 has a protruding configuration 210 having a transverse cross-section that tapers in thickness from the seal center portion 226 toward each one of the opposing seal side edges 230. The tapered transverse cross-section of the seal body 208 results in a relatively small thickness at each seal side edge 230 which facilitates a smooth transition for air flowing (e.g., from left-to-right or right-to-left in FIG. 5) along the structural surface and passing over the seal body 208. In this regard, the relatively small thickness of each seal side edge 230 improves the aerodynamics of the structure 150. In addition, the tapered transverse cross-sectional thickness of the seal body 208 reduces the weight of the seal body 208 relative to the weight of a seal body having a non-tapered transverse cross-section (not shown).

In FIG. 5, the seal body 208 is configured to cover a panel gap 172 located adjacent to the seal-engaging fasteners 400. As shown in FIG. 3, the panel gap 172 extends around the panel perimeter 178 of the access panel 154, and separates the panel perimeter 178 from the skin panel 158 which surrounds the access panel 154. The seal assembly 206 provides a smooth aerodynamic cover for covering the fastener heads 404 of multiple fasteners (e.g., seal-engaging fasteners 400 and standard fasteners—not shown) and optionally for covering the panel gap 172 located adjacent to the seal-engaging fasteners 400. In this regard, the seal body 208 has opposing seal side edges 230 that define a seal body width 209. The seal body width 209 allows the seal body 208 to span the panel gap 172 defined by the structure (e.g., the skin panel 158) and the access panel 154 that is attached to the structure 150. By covering the fastener heads 404 and optionally covering the panel gap 172, the seal system 200 may reduce the amount of aerodynamic drag that would otherwise be generated by air flowing over the exposed fastener heads 404 and panel gap 172.

Referring still to FIG. 5, in an embodiment, the seal assembly 206 may be electrically conductive. A seal assembly 206 that is electrically conductive may allow the seal assembly 206 to function as a conductive path across a panel gap 172 covered by the seal assembly 206. The seal body 208 may be formed of or may include electrically conductive material. In some examples, the seal body 208 may be formed of polymeric material (e.g., rubber, vinyl, plastic, etc.) containing conductive particles such as metallic particles embedded within the polymeric material. Alternatively or additionally, the seal body 208 may have a metallic mesh (not shown) embedded within or located at or near the seal top surface 220 or the seal bottom surface 222. The seal body 208 may be formed of composite material such as carbon-fiber epoxy. The carbon-fiber epoxy may include carbon material such as carbon fibers (e.g., unidirectional fibers, woven fibers, etc.), carbon particles, a carbon mesh sheet, or other forms of carbon that are electrically conductive. The seal body may be formed of carbon thermosets or carbon thermoplastics. The electrical conductivity of the seal assembly 206 may improve electromagnetic interference (EMI) protection of a structure 150 from lighting strikes by providing a conductive path across a panel gap 172 in addition to the conductive path that may be provided by an internally-located electrically component such as an internal doubler 168 that is metallic and which couples the access panel 154 to the skin panel 158 in FIG. 5. The seal-engaging fasteners 400 and the locking rings 300 may be electrically conductive to facilitate current flow through the seal-engaging fasteners 400, the locking rings 300, and the seal body 208.

Figure 6:
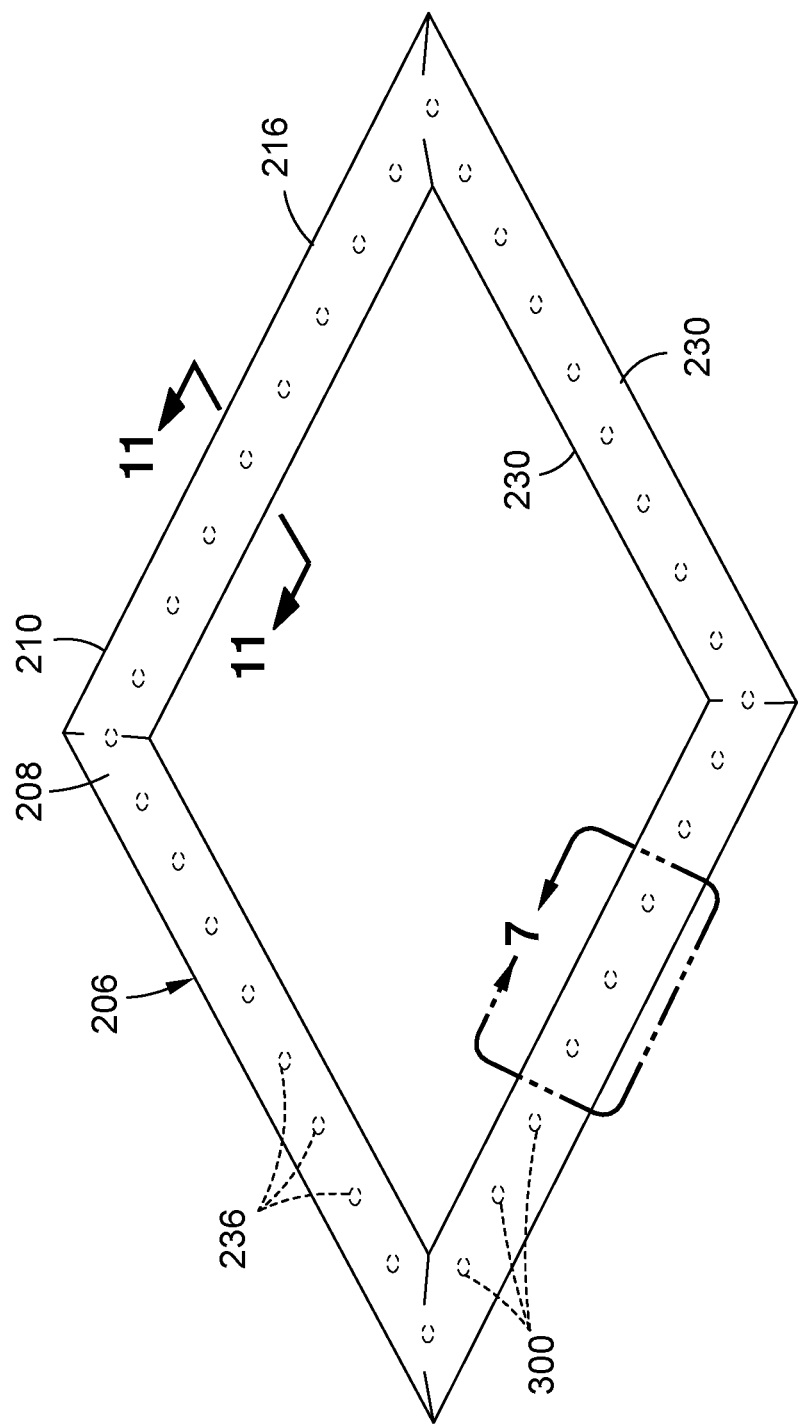
FIG. 6 is a perspective view of an example of a seal body formed in a closed-loop shape.

Referring to FIG. 6, shown is a perspective view of an example of a seal body 208 formed in a closed-loop shape 216 when viewed from a top-down direction. In the example shown, the closed-loop shape 216 is formed in the shape of a square. However, the seal body 208 may be formed in alternative closed-loop shapes 216 having one or more straight portions and/or one or more curved portions (not shown). The closed-loop shape 216 may include the shape of a polygon such as a triangle, a square, a rectangle, or other orthogonally-shaped or non-orthogonally shaped polygon. The closed-loop shape 216 may have straight portions that intersect or join at non-rounded corners (e.g., FIG. 6) or the straight portions may intersect or join at rounded corners (not shown). Alternatively, the closed-loop shape 216 may be a rounded shape such as a circular shape, an oval shape, or another rounded shape. Even further, the closed-loop shape 216 may have a combination of straight portions and curved portions. The seal body 208 may be formed or molded as a unitary structure into a closed-loop shape 216. Alternatively, a seal body 208 may be assembled into a closed-loop shape 216 from a plurality of straight portions and/or curved portions. For example, the square shape of the seal body 208 shown in FIG. 6 may be assembled by adhesively bonding together the ends of four (4) straight portions joined at the four (4) mitered corners.

Referring to FIGS. 7-9, shown is a portion of the seal body 208 of FIG. 6. FIG. 7 is a top-down perspective view of the seal body 208 portion showing a plurality of seal cutouts 248 formed in the seal top surface 220 for providing access to the seal cavities 236. In the example shown, the seal cutouts 248 and seal cavities 236 are circular in shape when viewed from a top-down direction. However, the seal cutouts 248 and seal cavities 236 may be formed in non-circular shapes. After a locking ring 300 is installed in each seal cavity 236, a cavity cover 250 may be adhesively bonded into each seal cutout 248 to capture the locking ring 300 within the seal cavity 236. The cavity covers 250 may be shaped and sized complementary to the seal cavities 236.

FIG. 8 is a top-down perspective view of a further example of a seal body 208 comprised of a lower portion 254 and an upper portion 252. The lower portion 254 has a plurality of the seal cavities 236 formed at spaced intervals along the length of the lower portion 254. The upper portion 252 may be devoid of seal cavities 236 and may be adhesively bonded to the lower portion 254 to encapsulate the locking rings 300 after locking rings 300 are installed in the seal cavities 236. When assembled to each other, the upper portion 252 and the lower portion 254 collectively define the transverse cross-section of the seal body 208.

FIG. 9 is a bottom-up perspective view of the portion of the seal body 208 of FIG. 6 showing a plurality of the cavity openings 244 for the seal cavities 236 (FIG. 7). Each cavity opening 244 is of a smaller size (e.g., diameter) than the seal cavity 236. Each cavity opening 244 is large enough to provide external access to the locking ring 300 contained within each seal cavity 236, and small enough to prevent the locking ring 300 from falling out of the cavity opening 244. In this regard, each cavity opening 244 is sized such that the ring inner perimeter 314 (FIG. 14) of the locking ring 300 is externally accessible to allow for engagement of the ring inner perimeter 314 with the locking ring engagement portion 410 (FIG. 5) of a seal-engaging fastener 400 (FIG. 5).

Figures 10, 11:
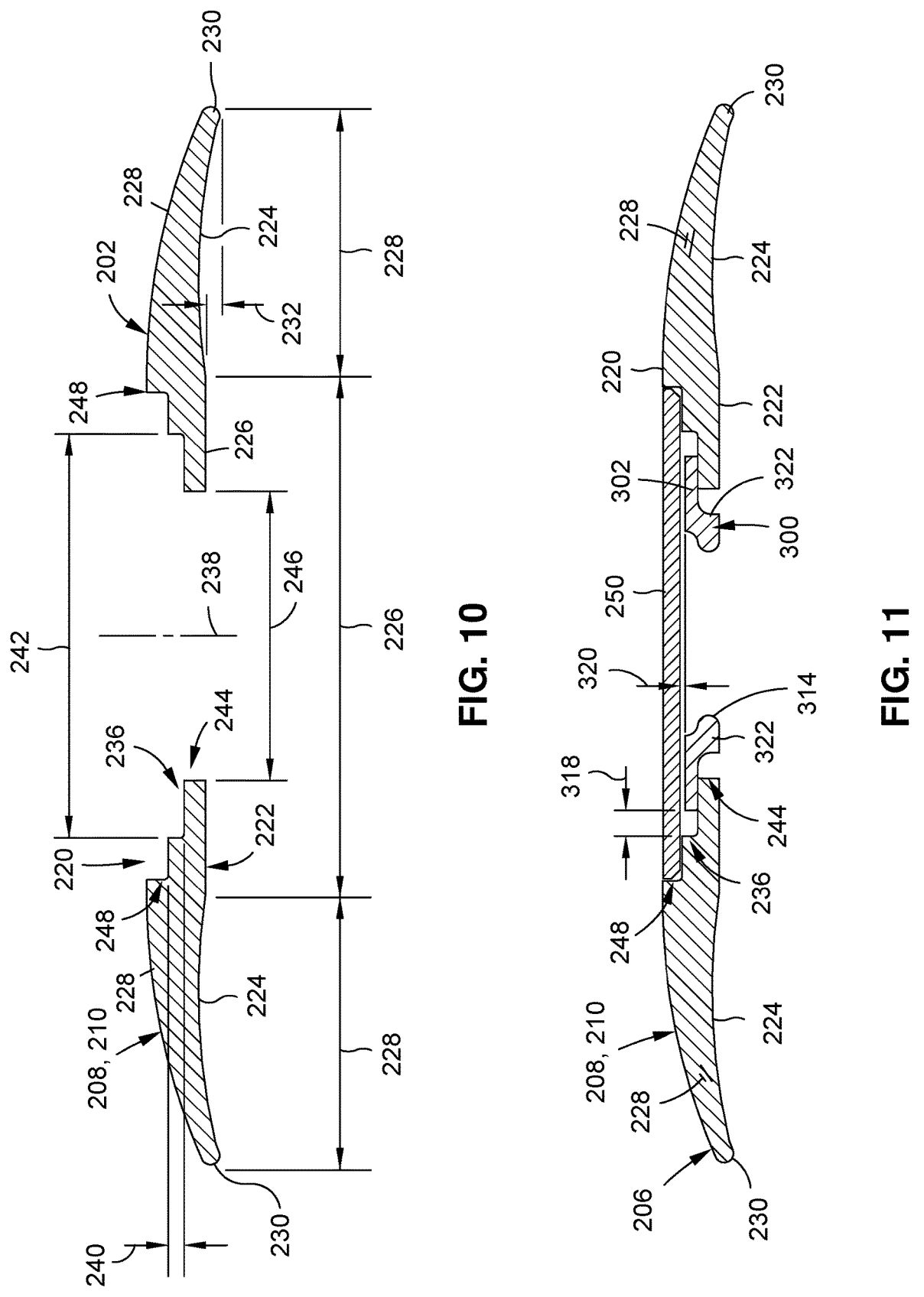

Referring to FIGS. 10-11, shown in FIG. 10 is a sectional view of the seal body 208 in an uninstalled state 202. The seal body 208 may be symmetrical about the cavity axis 238 as shown. However, in an embodiment not shown, the seal body 208 may be non-symmetrical about the cavity axis 238. As mentioned above, each seal body 208 has a seal top surface 220, a seal bottom surface 222, a seal center portion 226, and opposing seal side portions 228 each having a seal side edge 230. The seal cavity 236 is shown formed in the seal center portion 226. Each seal cavity 236 is open to the seal bottom surface 222 via the cavity opening 244. The seal cavity 236 opening has an opening width 246 (e.g., an opening diameter) that is smaller than the seal cavity width 242 so that the locking ring 300 (FIG. 4) is retained within the seal cavity 236.

In FIGS. 10-11, the top of each seal cavity 236 may be closed off by a cavity cover 250 (FIG. 11) that may be adhesively bonded into position within each seal cutout 248 to capture the locking ring 300 (FIG. 4) within the seal body 208, as mentioned above. Each seal cavity 236 has a seal cavity height 240 and a seal cavity width 242 (e.g., seal cavity diameter). The seal cavity width 242 is preferably slightly (e.g., at least 0.010 inch) larger than the width of the ring outer perimeter 312 (FIG. 14) of the locking ring 300 to provide radial float 318 capability of the locking ring 300 within the seal cavity 236. Radial float 318 capability of the locking ring 300 may accommodate variations in the spacing and/or alignment of the seal cavities 236 and/or variations in the spacing and/or alignment of the seal-engaging fasteners 400 (FIG. 5) installed in a structure 150. The seal cavity height 240 is preferably slightly (e.g., at least 0.030 inch) larger than the body thickness 308 (FIG. 15) of the locking ring 300 to allow slight vertical float 320 capability of the locking ring 300 within the seal cavity 236, and thereby prevent binding of the locking ring 300 which would undesirably prevent radial float of the locking ring 300.

Figure 24:
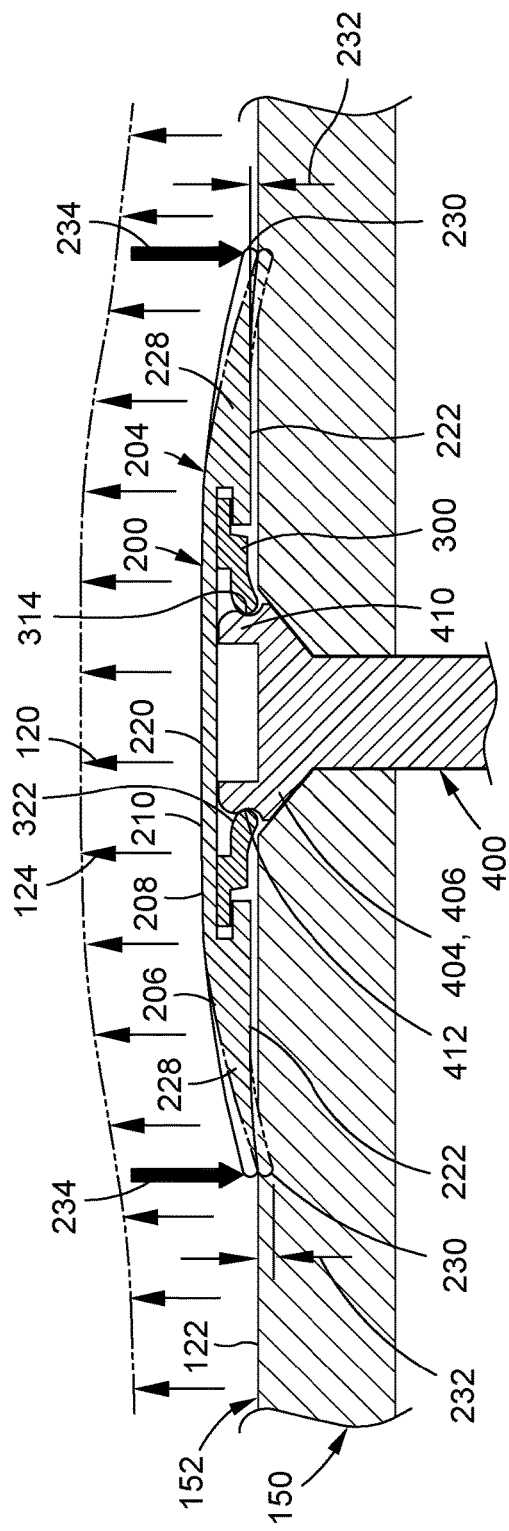
FIG. 24 is a sectional view of an example of preload acting on each of opposing seal side edges of a seal body to counteract the lifting force acting on the seal body as a result of negative aerodynamic pressure.

The seal body 208 may have a transverse cross-section such that when the seal assembly 206 is in an uninstalled state 202 (FIG. 4), the opposing seal side edges 230 are located at a side edge drop distance 232 (FIG. 10) below a vertical level of the same seal side edge 230 when the seal assembly 206 is in an installed state 204 (FIG. 5). As described in greater detail below, the side edge drop distance 232 may result in a preload 234 (FIG. 24) of the seal side edges 230 against the structural surface 152 (FIG. 24) along a direction normal to the structural surface 152 (FIG. 24). The preload 234 of the seal side edges 230 on the structural surface 152 advantageously maintains each seal side edge 230 in constant physical contact with the structural surface 152. In the present disclosure, the preload 234 on each seal side edge 230 is generally along a direction perpendicular to the structural surface 152.

In FIG. 10, the seal bottom surface 222 may include a radiused undercut 224 on each side of the cavity opening 244. Such undercuts 224 may extend along a lengthwise direction of the seal body 208, and may locally reduce the transverse cross-sectional thickness of the seal body 208 which may reduce the contact surface area of the seal side edge and thereby increase the preload 234 (FIG. 24) force per unit length along the seal side edges 230 against the structural surface 152 (FIG. 5), relative to the preload 234 force per unit length along the seal side edges of a seal body lacking undercuts. Regardless of whether the seal body 208 includes undercuts 224, the transverse cross-section of the seal body 208 is preferably configured such that the seal bottom surface 222 along the seal center portion 226 and the seal side portions 228 are vertically spaced above the structural surface 152 when the seal assembly 206 is installed on a plurality of seal engaging fasteners (FIG. 5), such that the only contact between the seal body 208 and the structural surface 152 is at the opposing seal side edges 230 as shown in FIG. 5.

The seal body 208 may be formed of any one a variety of materials including, but not limited to, polymeric material and/or metallic material. For example, the seal body 208 may be formed of fiberglass/epoxy, carbon/epoxy, fiberglass/thermoplastic, carbon/thermoplastic, or any one a variety of other polymeric or composite materials. In an embodiment, the seal body 208 may be formed of a resiliently flexible polymeric material such as rubber, silicone rubber, flexible polyvinyl chloride, or any other polymeric composition. Alternatively, the seal body 208 may be formed of metallic material such as aluminum, titanium, or other metallic material.

Referring to FIGS. 12-15, shown is an example of a locking ring 300. The locking ring 300 includes a ring body 302 having a ring top surface 304 and a ring bottom surface 306 defining a body thickness 308. The ring body 302 has a ring body inner diameter 310 and a ring body outer diameter 311 which defines the outer perimeter width of the locking ring 300. As mentioned above, the outer perimeter width (e.g., the ring body outer diameter 311) is preferably sized to provide radial float 318 (FIG. 11) capability of the locking ring 300 within the seal cavity 236 (FIG. 11). For example, the ring outer perimeter width may be sized to provide a radial float 318 capability of at least 0.030 inch and, more preferably, at least 0.060 inch. Such radial float 318 may accommodate dimensional variations in the locking rings 300 due to manufacturing tolerances, variations in the spacing and/or alignment of the seal-engaging fasteners 400 (FIG. 5) in the structure 150, and/or variations in the spacing and/or alignment of the seal cavities 236 formed in the seal body 208 due to manufacturing tolerances. As mentioned above, the body thickness 308 of the ring body 302 is preferably less than the seal cavity height 240 (FIG. 10). For example, the body thickness 308 may be approximately 0.005-0.010 inch less than seal cavity height 240 to provide vertical float 320 capability of locking ring 300 and thereby prevent binding that would inhibit radial float 318 of the locking ring 300, as mentioned above.

In FIGS. 12-15, the ring inner perimeter 314 has an inner perimeter width or diameter that is sized complementary to the width or diameter of the locking ring engagement portion 410 of the seal-engaging fasteners 400 (FIG. 5). As mentioned above, when the locking ring 300 is captured within a seal cavity 236 (FIG. 5), the ring inner perimeter 314 is externally accessible via the cavity opening 244 (FIG. 5) to allow engagement with a seal-engaging fastener 400. The ring body 302 includes a radial gap 316 such that the ring body 302 is a discontinuous circle, allowing the ring body 302 and ring inner perimeter 314 to elastically radially expand as the locking ring 300 is moved axially over uppermost portion of the locking ring engagement portion 410 (FIG. 5) of a seal-engaging fastener 400, after which the ring body 302 and the ring inner perimeter 314 radially contracts into seated engagement within the locking ring engagement portion 410 of the fastener head 404. The ring body 302 may be configured such that when the ring inner perimeter 314 radially contracts into seated engagement with the locking ring engagement portion 410, the ring inner perimeter 314 is preferably slightly (e.g., by at least 0.001 inch) radially expanded from its original unexpanded size such that the ring body 302 exerts a radial clamping force on the seal-engaging fastener 400, thereby preventing radial and axial movement of the locking ring 300 relative to the fastener head 404 of the seal-engaging fastener 400 when the structure 150 (e.g., an aircraft) is in service.

Figure 14:
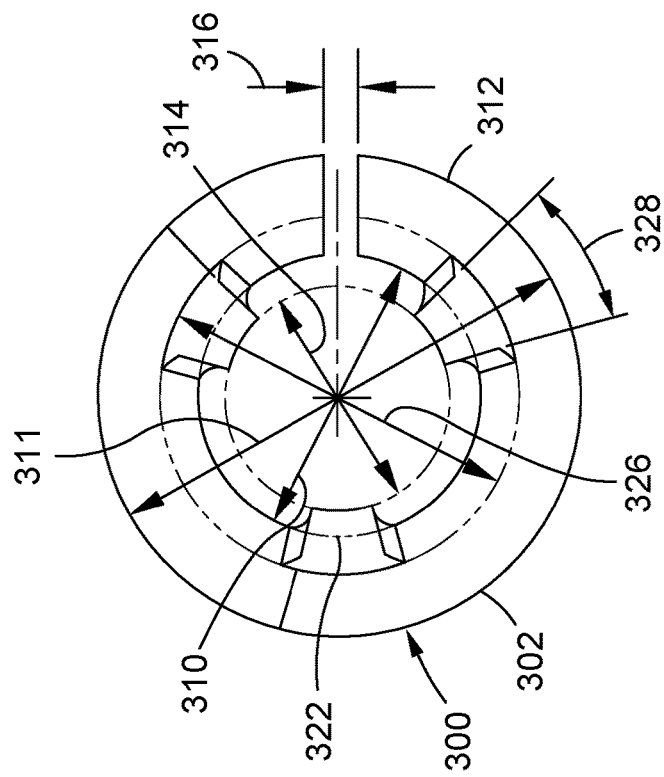
FIG. 14 is a bottom-up plan view of the locking ring of FIGS. 12-13 and illustrating three equi-angularly spaced tangs for centering the locking ring on the fastener head of a seal-engaging fastener.
Figure 15:
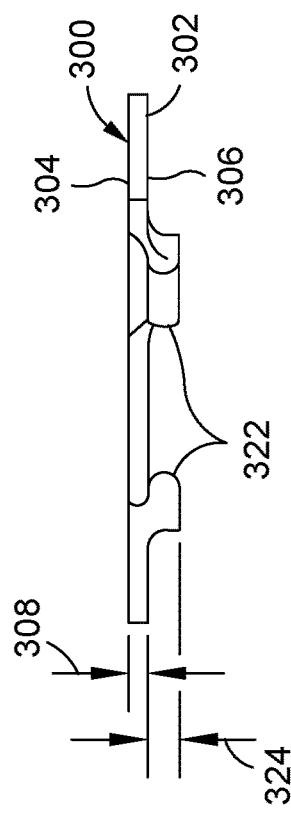
FIG. 15 is a side view of the locking ring of FIGS. 12-14.
Figure 12:
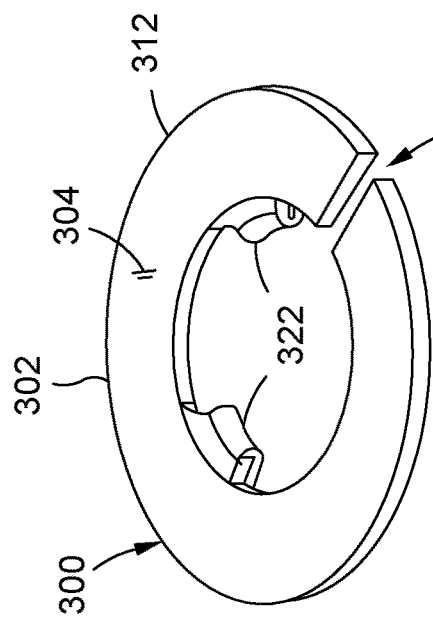
FIG. 12 is a top-down perspective view of an example of a locking ring having a ring body and a plurality of tangs protruding inwardly from the ring body inner diameter.
Figure 13:
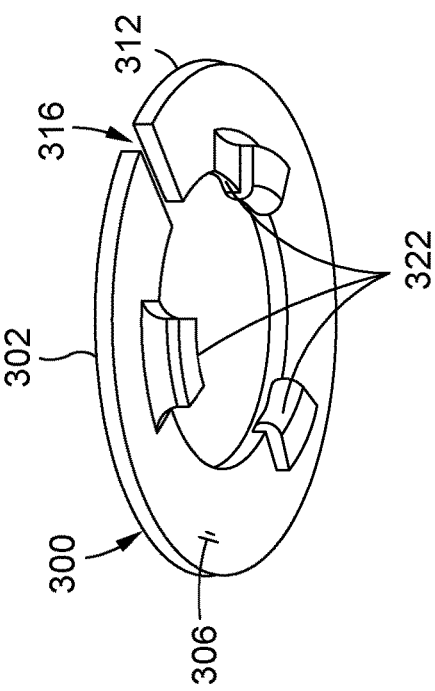
FIG. 13 is a bottom-up perspective view of the locking ring of FIG. 12 and illustrating the plurality of tangs protruding downwardly and radially inwardly from the ring bottom surface.

In the example of FIGS. 12-15, the locking ring 300 may include a plurality of tangs 322 protruding radially inwardly from the ring body inner diameter 310. However, in an embodiment not shown, the tangs may be omitted, resulting in the ring inner perimeter 314 being defined by the ring body inner diameter 310 which would directly engage with the locking ring engagement portion 410 of a seal-engaging fastener 400 (FIG. 5). However, in the example of FIG. 12-15, the locking ring 300 includes three (3) equi-angularly spaced tangs 322 (i.e., at a tang angular spacing of 90°) for centering the locking ring 300 on the fastener head 404 of a seal-engaging fastener 400. Although three (3) tangs 322 are shown, the locking ring 300 may include more than three (3) tangs 322 which may be either equi-angularly spaced on non equi-angularly spaced. In FIG. 14, each tang 322 may define a tang sweep angle 328 of approximately 30°. However, the tangs 322 may be formed in a larger or smaller tang sweep angle 328. In this regard, the geometry of the ring body 302 and the tangs 322 may be configured according to the desired magnitude of the force required to engage and disengage a locking ring 300 from a seal-engaging fastener 400.

In FIGS. 12-15, the ring inner perimeter 314 of the locking ring 300, as defined by the tangs 322, is sized to engage the locking ring engagement portion 410 (FIG. 5) of a seal-engaging fastener 400 (FIG. 5). For example, the plurality of tangs 322 may be configured to engage an annular groove 412 (FIG. 5) extending around a circumference of the locking ring engagement portion 410 of a fastener head 404 of a seal-engaging fastener 400. The radially inner portion of each tang 322 may have a radial cross-sectional shape that is complementary to the radial cross-sectional shape of the annular groove 412. For example, the radially inner portion of each tang 322 may have a rounded or radiused cross-sectional shape that is complementary to the rounded or radiused cross-sectional shape of the annular groove 412. In an embodiment, the radially inner portion of each tang 322 may have a full radius (e.g., 180°) when viewed in radial cross-section. The rounded or radiused cross-sectional shape of the tangs 322 and annular groove 412 may allow the tangs 322 to smoothly (e.g., with linearly increasing and decreasing force) engage to and disengage from the annular groove 412 as the locking ring 300 is axially moved over the locking ring engagement portion 410 of a fastener head 404 of a seal-engaging fastener 400.

In FIGS. 12-15, the tangs 322 may protrude downwardly at a tang depth 324 (FIG. 15) from the ring bottom surface 306 of the ring body 302. In addition, the tangs 322 may protrude radially inwardly from the ring body inner diameter 310. As shown in FIG. 14, the tangs 322 have a tang outer diameter 326 defined at the tangent to the fillet radii between the tangs 322 and the ring bottom surface 306. The tang outer diameter 326 is preferably smaller than the opening width 246 (e.g., diameter) to allow the ring bottom surface 306 to lie flush on the bottom surface of the seal cavity 236. The seal system 200 including the seal-engaging fasteners 400 (FIG. 5), the seal body 208, and the locking rings 300 are configured such that the tangs 322 protrude downwardly from the ring bottom surface 306 at a tang depth 324 that results in the seal bottom surface 222 (FIG. 5) being vertically spaced above the structural surface 152 (FIG. 5) of a structure 150 (i.e., a panel surface 156 of an access panel 154 and/or a skin surface 160 of a skin panel—FIG. 5) to which the seal assembly 206 is attached via the seal-engaging fasteners 400. Such an arrangement of the seal system 200 results in only the seal side edges 230 contacting the structural surface 152 (e.g., the panel surface 156 and/or the skin surface 160), and the remaining portion of the seal bottom surface 222 being vertically spaced above the structural surface 152.

Figure 16:
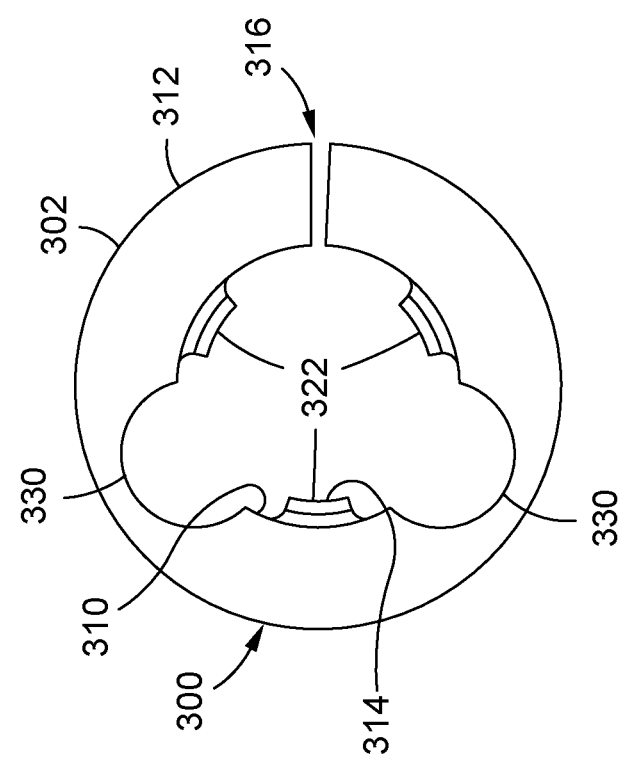
FIG. 16 is a plan view of an example of a locking ring having scallops formed in the ring inner perimeter.

Referring to FIG. 16, shown is a locking ring 300 having scallops 330 formed in the ring body inner diameter 310. In the example shown, the ring body 302 includes a pair of scallops 330 respectively between two adjacent pairs of tangs 322. The scallops 330 locally reduce the radial width of the ring body 302 at the location of each scallop 330 and which reduces the radial stiffness of the ring body 302 to increase the ability of the ring body 302 to radially expand as the locking ring 300 is axially moved over the locking ring engagement portion 410 (FIG. 5) of a fastener head 404 (FIG. 5) of a seal-engaging fastener 400 (FIG. 5). The scallops 330 may also reduce the out-of-plane stiffness of the tangs 322. The scallops 330 may reduce the stiffness of the locking ring 300 as a means to reduce the amount of force required to engage and disengage the locking ring 300 from a seal-engaging fastener 400.

As mentioned above, the geometry of the locking ring 300 such as the depth of the scallops 330, the body thickness 308 of the ring body 302, the number of tangs 322, the diameters of the locking ring 300, and other locking ring dimensions may be configured or tailored according to the desired magnitude of the force for engaging and disengaging a locking ring 300 from a seal-engaging fastener 400. For example, as discussed below, the locking ring 300 geometry may be based on the magnitude of a lifting force 120 (FIG. 24) that is aerodynamically-induced acting on the seal assembly 206 and which may be generated by negative aerodynamic pressure 124 (FIG. 23) acting on the surface of an aircraft structure 102 to which the seal system 200 is attached, as described below. In addition to tailoring the geometry of the locking ring 300, the material from which the locking ring 300 is formed may also be selected based on the magnitude of the force for engaging and disengaging the locking ring 300 from the seal-engaging fastener 400. In some examples, the locking ring 300 may be formed of metallic material such as stainless steel, aluminum, titanium or other metallic materials. Alternatively, the locking ring 300 may be formed of non-metallic material such as rigid polymeric material (e.g., Nylon™), polyethylene, or other relatively rigid, high-strength polymeric material.

Figure 17:
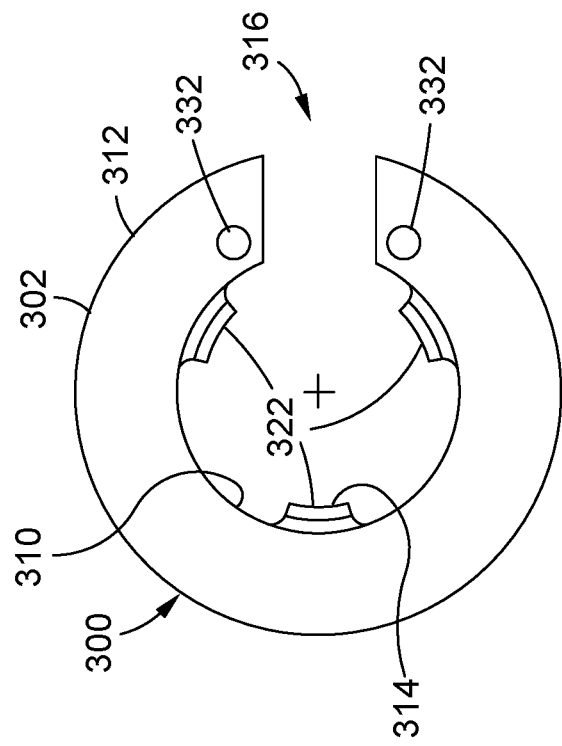
FIG. 17 is a plan view of a still further example of a locking ring having a pair of ring body holes for engagement by a snap ring pliers (not shown)

FIG. 17 shows an example of a locking ring 300 having a pair of ring body holes 332 located on opposite sides of the radial gap 316. The ring body holes 332 may be sized and configured to be engaged by a snap ring pliers (not shown) for temporarily radially contracting the ring body 302 to reduce the width (diameter) of the ring outer perimeter 312 to a size smaller than the opening width 246 (FIG. 10) of the cavity opening 244 (FIG. 10) to facilitate insertion of the locking ring 300 into the seal cavity 236 (FIG. 9) from the seal bottom surface 222 (FIG. 9). The locking ring 300 may be provided with a relatively large radial gap 316 in order to allow for an increased amount of radial contraction of the locking ring 300 using snap ring pliers (not shown). Although the ring top surface 304 and ring bottom surface 306 of the ring body 302 may be flat or planar, in an embodiment not shown, the ring body 302 may have a slight helical shape (not shown) to allow the opposing circumferential ends of the locking ring 300 on opposite sides of the radial gap 316 to overlap one another during radial contraction of the ring body 302 using snap ring pliers. After the locking ring 300 is inserted into the seal cavity 236, the snap ring pliers may be released allowing the ring outer perimeter 312 to radially expand back to its original width or diameter, thereby preventing the locking ring 300 from falling out of the seal cavity 236 through the cavity opening 244.

Figure 19:
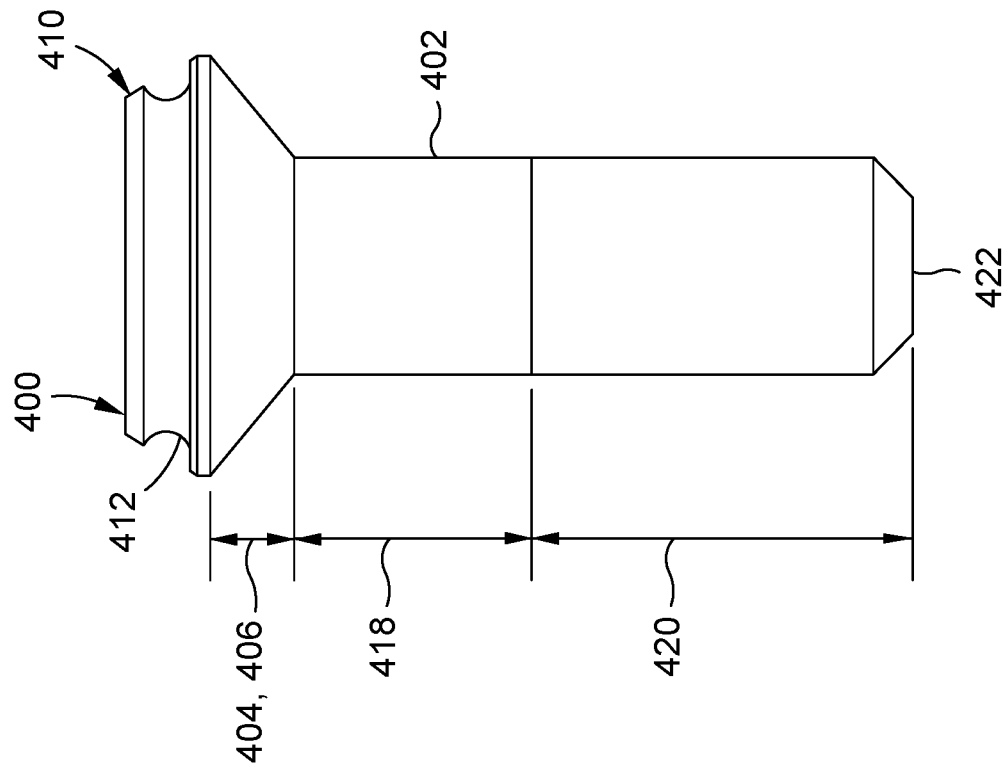
FIG. 19 is a side view of the seal-engaging fastener of FIG. 18.
Figure 18:
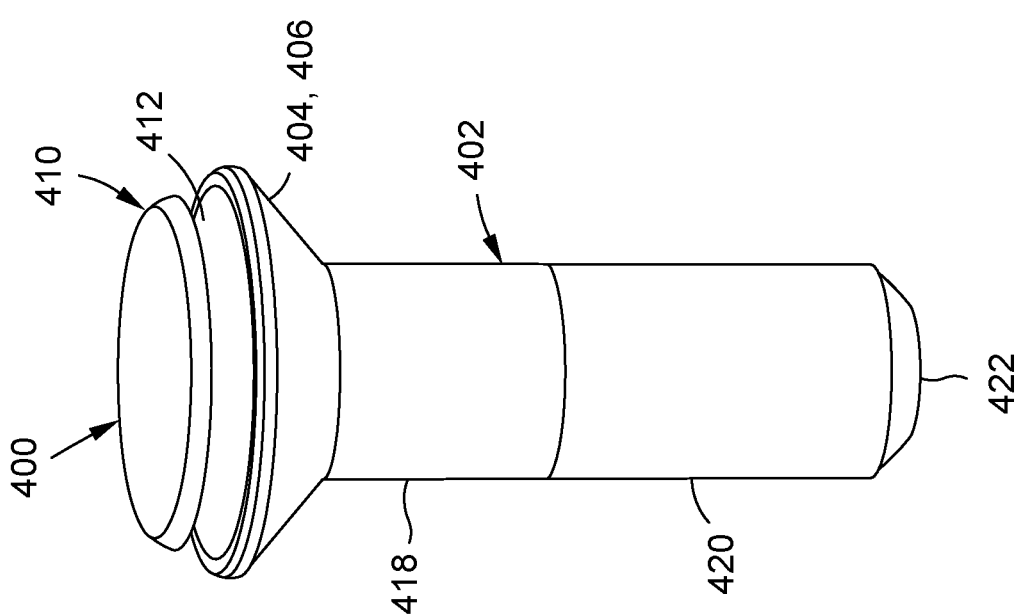
FIG. 18 is a perspective view of an example of a seal-engaging fastener having a countersunk head and further illustrating the locking ring engagement portion configured as an annular groove extending around the circumference of the locking ring engagement portion.

Referring to FIGS. 18-19, shown is an example of a seal-engaging fastener 400 having a fastener shank 402 and a fastener head 404 configured as a countersunk head 406. The locking ring engagement portion 410 protrudes upwardly from the countersunk head, and includes an annular groove 412 extending around the circumference of the locking ring engagement portion 410. The annular groove 412 is sized and configured to receive the ring inner perimeter 314 of a locking ring 300 (FIGS. 12-15). As mentioned above and as shown in FIGS. 12-15, the ring inner perimeter 314 of a locking ring 300 may be defined by a plurality of tangs 322 of the locking ring 300.

In FIGS. 18-19, at the base of the annular groove 412, the locking ring engagement portion 410 may have a larger diameter than the diameter of the locking ring engagement portion 410 at the top of the annular groove 412. The larger diameter of the locking ring engagement portion 410 near the base of the annular groove 412 may prevent downward (e.g., toward the fastener shank 402) axial movement of a locking ring 300 (FIG. 5) once seated in the annular groove 412, while the smaller diameter of the locking ring engagement portion 410 near the top of the annular groove 412 may allow for axial movement of the locking ring 300 over the top of the locking ring engagement portion 410 (FIG. 5) during the attachment and detachment of the locking ring 300 from the seal-engaging fastener 400. In some examples, the upper circumferential edge of the locking ring engagement portion 410 be chamfered to facilitate axial movement of the locking ring 300 over the locking ring engagement portion 410.

In FIGS. 18-19, the seal-engaging fastener 400 may be a threaded fastener configured as a bolt or a screw. The fastener shank 402 has a non-threaded portion 418 and a threaded portion 420 terminating at a fastener end 422. The threaded portion 420 may be externally threaded for engagement to internal threads (not shown) of a threaded receptacle 176 (FIG. 5) such as a nut, a floating nut plate, a non-floating nutplate, a threaded insert, or other threaded receptacle configurations.

For seal-engaging fasteners 400 (FIG. 5) that are installed in a structure 150 (FIG. 5) by rotation of the seal-engaging fastener 400 relative to a threaded receptacle 176 (FIG. 5), the fastener head 404 may include a rotational-driving feature 414 (FIG. 5) such as an internal recess 416 (FIG. 5) for engagement by a rotatable tool or bit (not shown). For example, the internal recess 416 may be configured as a slot for engagement by a blade screwdriver, a Phillips recess for engagement by a Phillips screwdriver, a Torx™ recess for engagement by a Torx™ drive bit, an Allen recess for engagement by an Allen wrench or Allen drive bit, or any one of a variety of other internal recess configurations for rotating the seal-engaging fastener 400 for installation and removal from a threaded receptacle 176. In an alternative embodiment such as shown in FIGS. 18-19, one or more of the seal-engaging fasteners 400 may have a fastener head 404 that is devoid of a rotational-driving feature 414, and the rotational-driving feature 414 may instead be formed on the fastener end 422 of the threaded portion 420. For example, a threaded pin such as a Hi-Lok™ may be non-rotatably installed in a mounting hole 174 of a structure 150, and may include an Allen recess on the fastener end 422 of the Hi-Lok™ to prevent rotation of the Hi-Lok™ while a collar (not shown) is rotated onto the threaded portion 420 of the Hi-Lok™.

Although not shown, a seal-engaging fastener 400 may have the rotational-driving feature 414 formed on the exterior of the fastener head 404. For example, one or more flats, axially-oriented ribs, knurls, or other mechanical features may be formed on the exterior of the fastener head 404 to facilitate manual rotation of the seal-engaging fastener 400. Such rotational-driving features 414 may be located below the annular groove 412 of the locking ring engagement portion 410 to avoid interfering with the axial movement of a locking ring 300 (FIGS. 12-15) over the locking ring engagement portion 410 during engagement and disengagement of the locking ring 300 with the annular groove 412. Although not shown, a seal system 200 (FIG. 5) may include one or more seal-engaging fasteners 400 configured as non-threaded fasteners (not shown). Examples of a non-threaded fasteners include a rivet, a pin, or any other type of non-threaded fastener having a locking ring engagement portion 410 formed on the fastener head 404.

Figure 20:
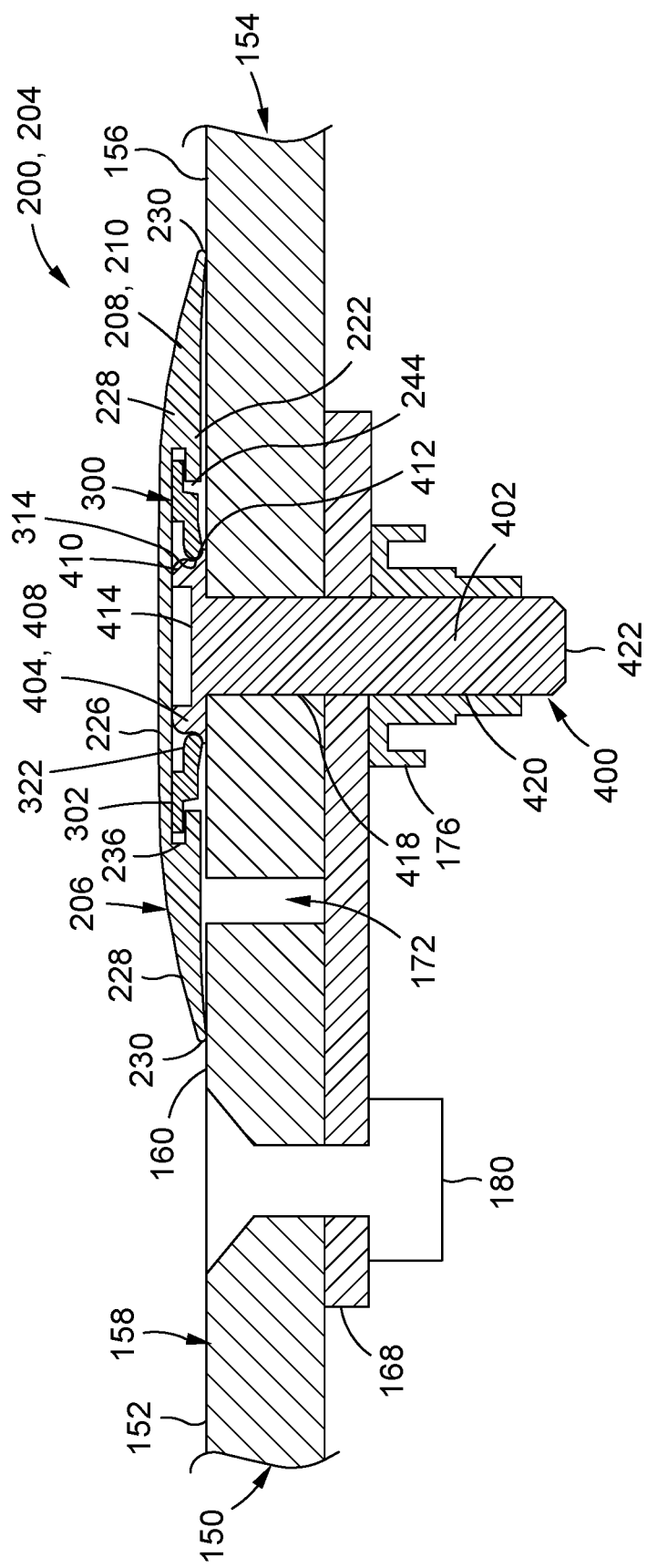
FIG. 20 is a sectional view of a seal installation in which the seal-engaging fastener has a dome head.
Figure 22:
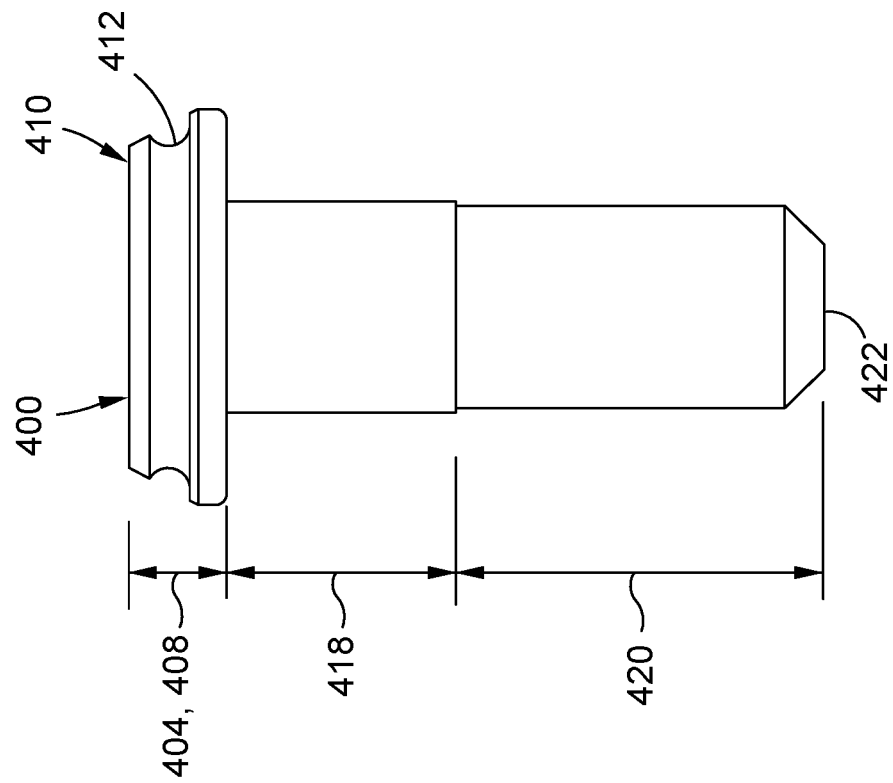
FIG. 22 is a side view of the seal-engaging fastener of FIG. 21.
Figure 21:
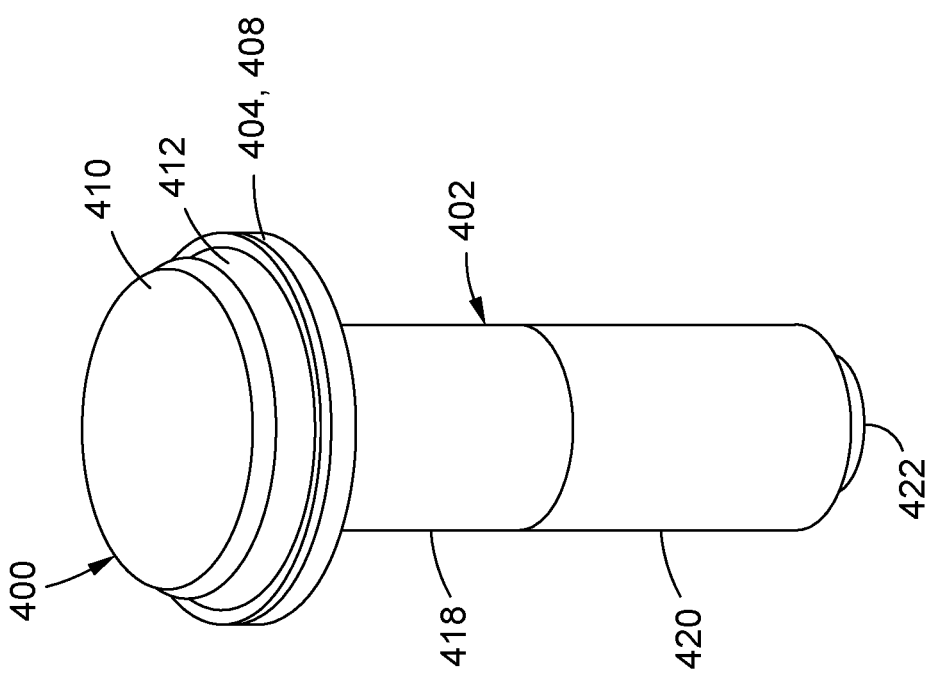
FIG. 21 is a perspective view of the seal-engaging fastener of FIG. 20.

Referring to FIGS. 20-22, shown in FIG. 20 is an example of a seal system 200 in which the seal-engaging fastener 400 has a fastener head 404 configured as a dome head 408 which serves as the locking ring engagement portion 410 of the seal-engaging fastener 400. Alternatively, in an embodiment not shown, a locking ring engagement portion 410 may be formed on top of the dome head 408. In the example shown in FIG. 20, the configuration and functionality of the components (e.g., the seal body 208 and the locking rings 300) of the seal system 200 having seal-engaging fasteners 400 (FIGS. 20-22) with dome heads 408 is similar to the above-described seal system 200 (FIG. 5) having seal-engaging fasteners 400 that have countersunk heads 406. For example, the locking ring engagement portion 410 of a seal-engaging fastener 400 with a dome head 408 may include an annular groove 412 extending around the circumference of the dome head 408 (i.e., the locking ring engagement portion 14). The seal-engaging fastener 400 with dome head 408 may be provided as a threaded fastener or as a non-threaded fastener (not shown). The dome head 408 may include an annular groove for engaging with a locking ring 300 (FIGS. 12-15). At the base of the annular groove 412, the dome head 408 may have a larger diameter than the diameter of the dome head 408 near the top of the annular groove 412. The larger diameter near the base of the annular groove 412 may prevent downward axial movement of the locking ring 300 (FIG. 5) once seated in the annular groove 412.

Figure 23:
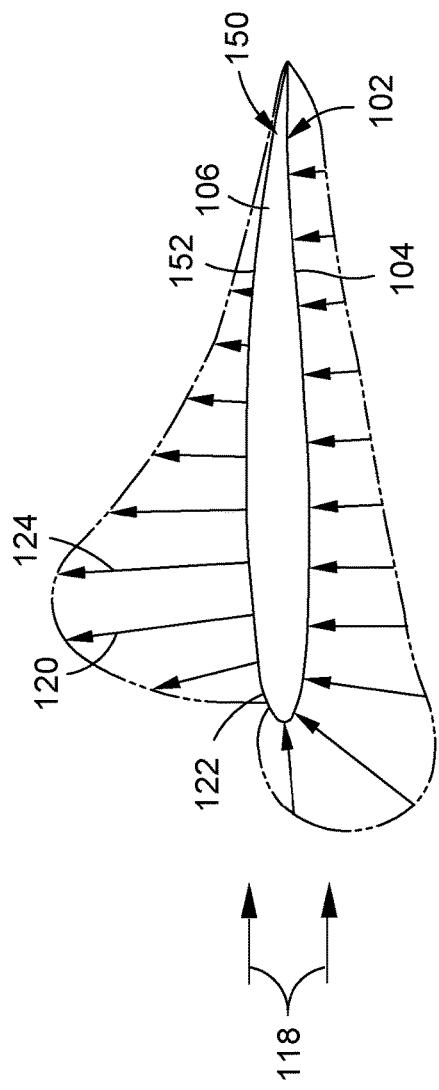
FIG. 23 is a sectional view of the aircraft wing of FIG. 2 and illustrating negative aerodynamic pressure generated on the wing upper surface as a result of air flow over the wing.

FIG. 23 shows an example of an airfoil section such as an aircraft wing 106, and illustrates the profile of aerodynamic pressure on the wing 106 as a result of air flowing over the wing 106. For example, the wing lower surface may be subjected to positive aerodynamic pressure acting along a direction toward the wing lower surface. In contrast, the wing upper surface may be subjected to negative aerodynamic pressure 124 acting along a direction away from the wing upper surface, and resulting in lift generated by the wing 106.

FIG. 24 is a sectional view of a protruding configuration 210 of a seal assembly 206 engaged to seal-engaging fasteners 400 installed on a structure 150. As mentioned above with reference to FIGS. 10-11, the seal body 208 in FIG. 24 is configured such that when the seal assembly 206 is in an uninstalled state 202 (e.g., FIG. 4), at least one of the seal side edges 230 is located at a side edge drop distance 232 that is below the vertical level of the same seal side edge 230 when the seal assembly 206 is in an installed state 204 (FIG. 24). In such an arrangement, the seal body 208 may configured such that when the seal assembly 206 is in an installed state 204 as shown in FIG. 24, the preload 234 on each seal side edge 230 is at least as large in magnitude as a lifting force 120 acting on the seal body. In the present disclosure, a lifting force 120 on the seal body 208 is along a direction away from and approximately perpendicular to the structural surface 152 of a structure 150.

For examples where the structure 150 is an aircraft structure 102 (e.g., a fuselage 104, a wing 106, a tail surface, an engine nacelle, etc. —FIG. 1) having an aerodynamic surface 122, the lifting force 120 on the seal body 208 may be caused by negative aerodynamic pressure 124 (FIG. 23) acting on the aerodynamic surface 122 when freestream air 118 (FIG. 22) flows over the aerodynamic surface 122 such as when the aircraft 100 (FIG. 1) moves through the air. Advantageously, the preload 234 shown in FIG. 24 prevents the seal side edges 230 from being lifted away from the structural surface 152 under the lifting force 120 of the negative aerodynamic pressure 124, which would otherwise result in a gap forming between the seal side edges 230 and the aerodynamic surface 122, disrupting the airflow, generating aerodynamic drag, and increasing flow separation downstream of the seal assembly 206. In an embodiment, the seal body 208 may be configured such that the preload 234 on each of the seal side edges 230 is larger than the lifting force 120 (e.g., the negative aerodynamic pressure 124) on the seal body 208 as a means to counteract the lifting force 120 and thereby maintain each seal side edge 230 in constant physical contact with the aerodynamic surface 122.

Figure 25:
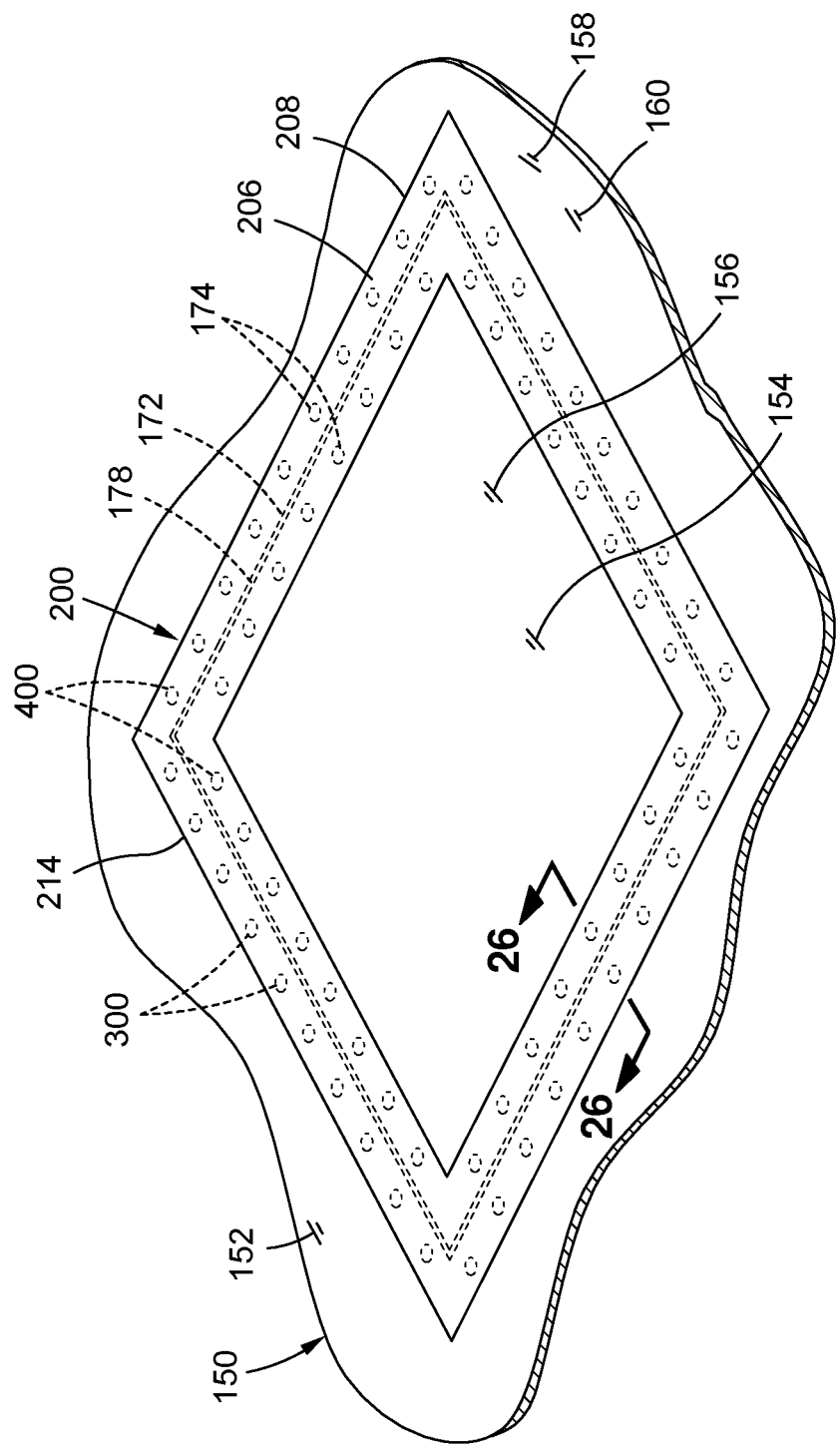
FIG. 25 is an example of a seal assembly wherein the seal body has a double row configuration comprising two rows of seal cavities for engagement via locking rings to two corresponding rows of seal-engaging fasteners installed around a perimeter of an access panel.
Figure 26:
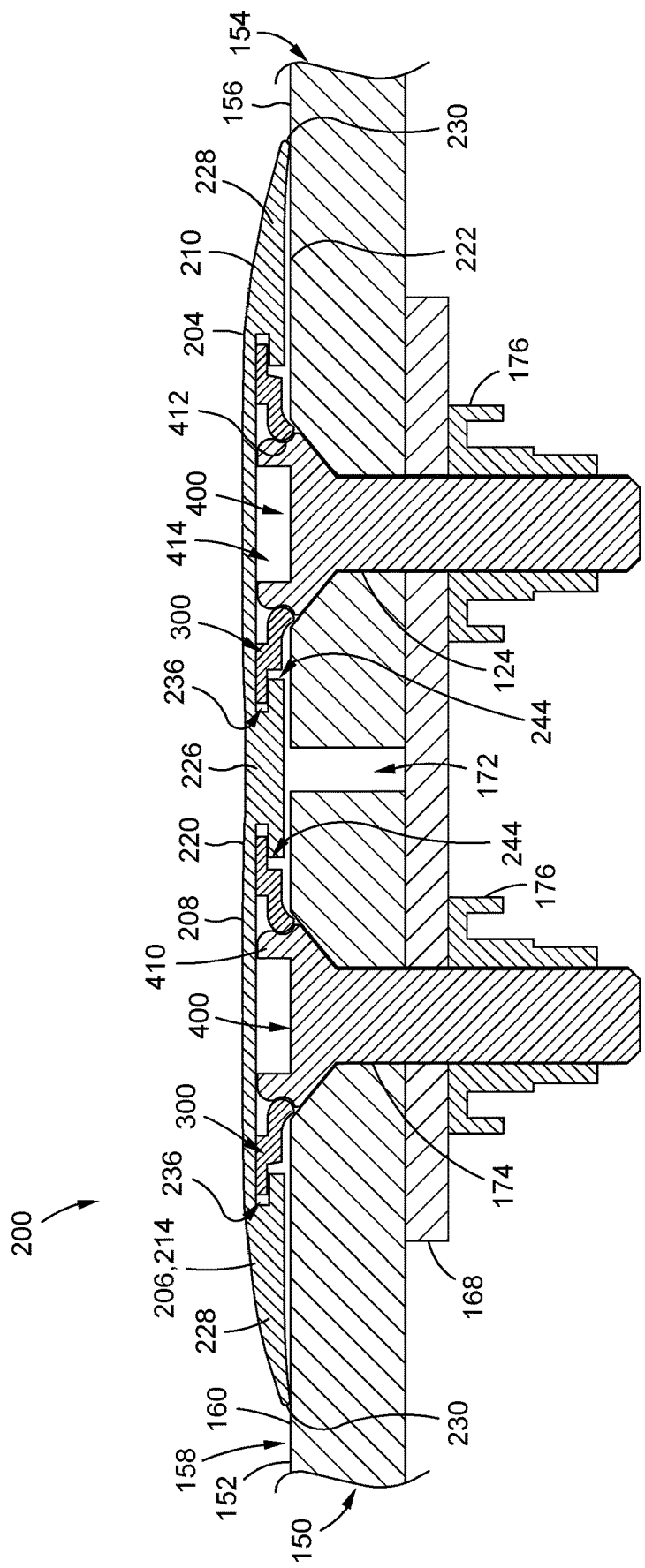
FIG. 26 is a sectional view of the seal installation of FIG. 25 and illustrating the double row configuration of the seal body engaged to a double row of seal-engaging fasteners installed on opposite sides of a panel gap between the access panel and a skin panel.

Referring to FIGS. 25-26, shown is an example of a seal assembly 206 in a double-row configuration 214 comprising two rows of seal cavities 236 extending around the perimeter of the seal body 208 for engagement to two corresponding rows of seal-engaging fasteners 400 installed around the panel perimeter 178 of the access panel 154. In the example shown, the two rows of seal-engaging fasteners 400 may be installed along the respective panel edges of the skin panel 158 and the access panel 154 on opposite sides of the panel gap 172. The seal system 200 shown in FIGS. 25-26 includes the same structure and functionality as the above-described seal system 200 shown in FIGS. 3-10, with the exception that the seal body 208 has two rows of seal cavities 236 spaced along the lengthwise direction of the seal body 208. As mentioned above, the plurality of seal cavities 236 are configured to contain a corresponding quantity of locking rings 300 for engaging the locking ring engagement portion 410 of a corresponding quantity of seal-engaging fasteners 400 arranged in two rows in the structure 150. The seal cavities 236 in the two rows are aligned in side-by-side relation to each other. However, in an embodiment not shown, the two rows of seal cavities 236 may be offset from each other. The spacing between the seal cavities 236 in one row may be the same or different as the spacing between the seal cavities 236 in the other row. Although FIGS. 25-26 illustrate the seal body 208 in a protruding configuration 210, in an embodiment not shown, the seal body 208 of FIGS. 25-26 may be provided in a flush configuration 212 similar to the seal body 208 shown in FIGS. 29-30 and described below.

FIG. 27 is a plan view of an example of a seal body 208 having a closed-loop shape 216 configured as a circle. However, as mentioned above, the seal body 208 may be provided in any one of a variety of closed-loop shapes 216 including shapes having straight portions such as a square or other polygon shape, or in a rounded shape having one or more rounded portions. Even further, the seal body 208 may be provided in a closed-loop shape 216 having a combination of straight portions and curved portions.

FIG. 28 is a plan view of an example of a seal body 208 having a non-closed-loop shape 218 when viewed from a top-down direction. The non-closed-loop shape 218 may include a straight shape extending along the length of a manufacturing joint between a pair of skin panels 158 arranged in edge-to-edge relationship. Alternatively, a non-closed-loop shape 218 of a seal body 208 may have a non-straight shape such as a serpentine shape (not shown) or any other shape in which the seal body 208 has lengthwise ends that are non-joined or non-abutted with each other.

Figure 29:
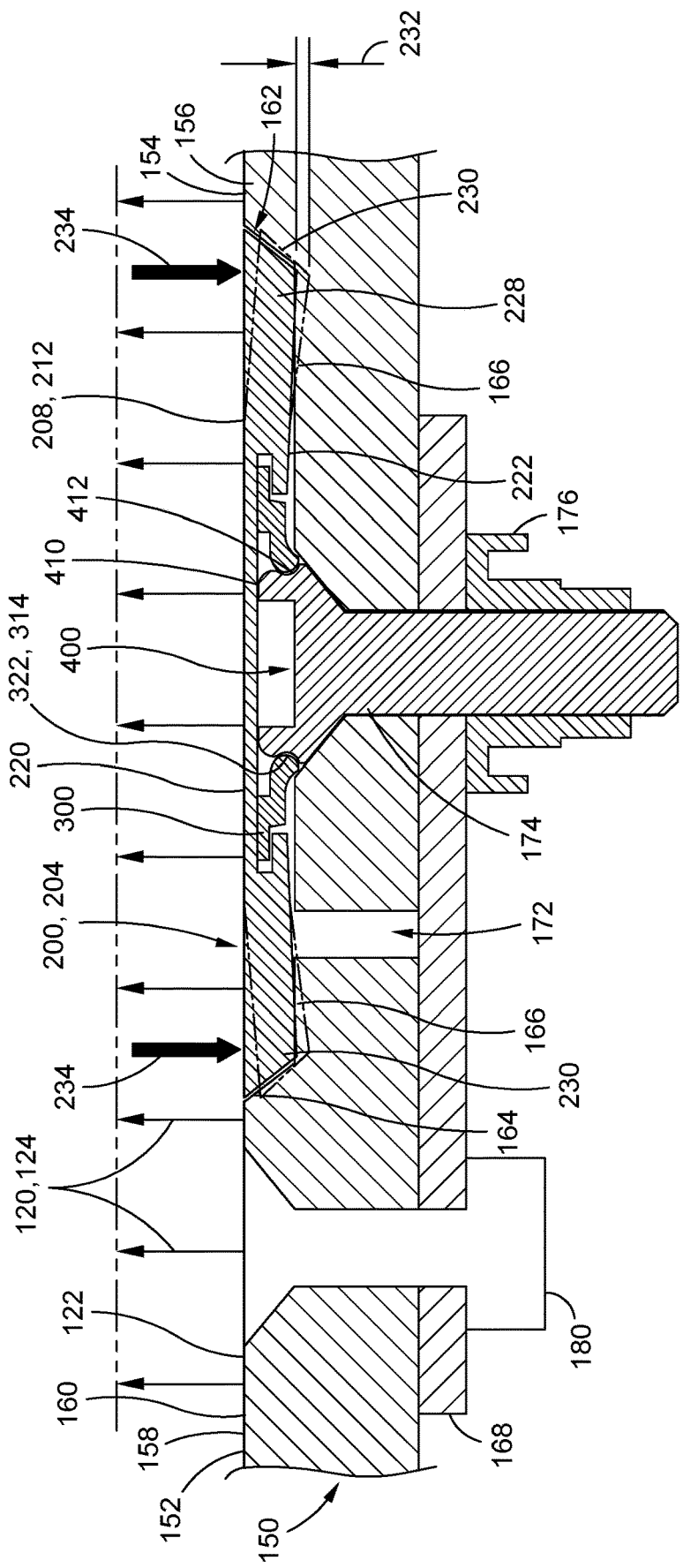
FIG. 29 is a sectional view of an example of a seal body in an installed state and having a flush configuration in which the seal top surface is approximately flush with the panel surface of the access panel and the skin surface of the skin panel.
Figure 30:
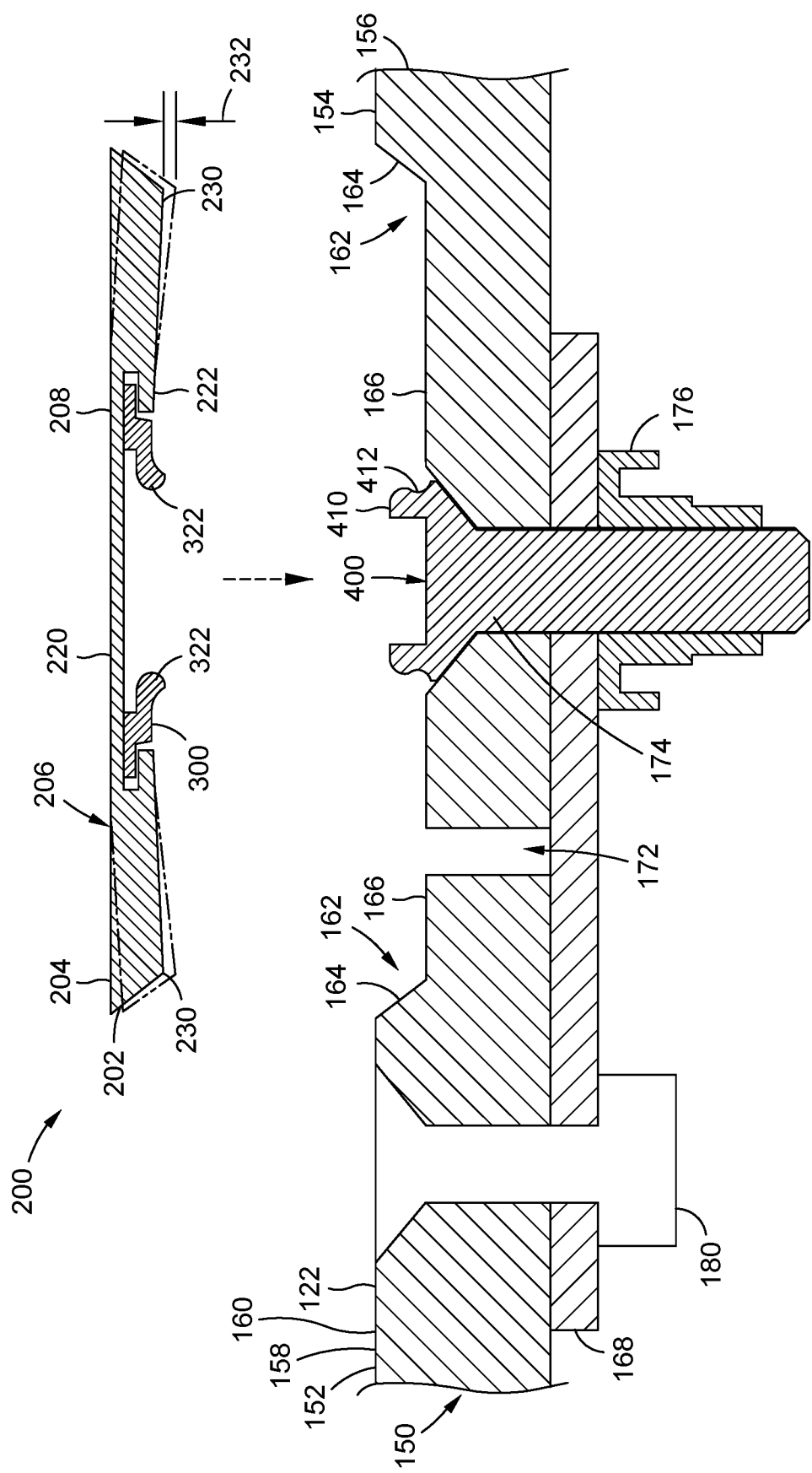
FIG. 30 is a partially exploded sectional view of the seal body in the flush configuration and further illustrating the side edge drop distance of the seal side edges in the installed state relative to the location (e.g., height) of the seal side edges in the uninstalled state.

Referring to FIGS. 29-30, shown is an example of a seal system 200 in a flush configuration 212. The seal body 208 has a transverse cross-section configured complementary to panel recesses 162 formed in the structural surface 152. FIG. 29 shows the seal assembly 206 in an installed state 204 in which the seal top surface 220 is approximately flush with the structural surface 152 to which the seal assembly 206 is mounted. For example, in FIG. 29, the seal top surface 220 is approximately flush with the panel surface 156 of the access panel 154 and approximate flush with the skin surface 160 of the skin panel 158. FIG. 30 shows the seal assembly 206 in an uninstalled state 202 (i.e., a non-stressed state).

In FIGS. 29-30, the structural surface 152 includes the panel surface 156 of an access panel 154 and the skin surface 160 of a skin panel 158. The access panel 154 and the skin panel 158 each have a panel recess 162 on opposite sides of the panel gap 172 and formed around a perimeter of the access panel 154. Each one of the panel recesses 162 includes a recess bottom surface 166 and a recess side surface 164. The recess bottom surface 166 of the panel recess 162 in the skin panel 158 may be parallel to the skin surface 160 of the skin panel 158. Likewise, the recess bottom surface 166 of the panel recess 162 in the access panel 154 may be parallel to the panel surface 156 of the access panel 154. The seal body 208 is configured to cover the panel gap 172 between the access panel 154 and the skin panel 158. The seal body 208 has a transverse cross-section that is configured complementary to the panel recess 162 in the skin panel 158 and the panel recess 162 in the access panel 154 such that when the seal assembly 206 is attached to the seal-engaging fasteners 400, the seal top surface 220 is approximately flush (e.g., within 0.060 and, more preferably, within 0.030 inch) with the skin surface 160 and the panel surface 156.

In FIGS. 29-30, the recess side surface 164 of each panel recess 162 may be sloped at a non-perpendicular angle (e.g., between approximately 10°-80°) relative to the corresponding skin surface 160 and panel surface 156. For example, each recess side surface 164 may be oriented at an angle of approximately 45° relative to the respective panel surface 156 and skin surface 160. In addition, each one of the seal side edges 230 may be formed at an angle that is approximately equal to (e.g., within 30°) the angle of the recess side surfaces 164. By forming the recess side surfaces 164 and the seal side edges 230 at non-perpendicular angles relative to the skin surface 160 and panel surface 156, each one of the opposing seal side portions 228 of the seal body 208 may nest within the corresponding panel recesses 162 during seal assembly 206 installation without the seal side edges 230 hanging up or binding on the uppermost edge of the recess side surfaces 164, as may otherwise occur if the recess side surfaces 164 and seal side edges 230 were oriented perpendicular to the skin surface 160 and panel surface 156. In addition, forming the recess side surfaces 164 and seal side edges 230 at a non-perpendicular angle may allow for a relatively close tolerance fit (e.g., less than 0.030 inch gap) between each seal side edge 230 and the corresponding recess side surface 164. The relatively close tolerance fit between each seal side edge 230 and the corresponding recess side surface 164, and the approximately flush relationship of the seal top surface 220 with the panel surface 156 and skin surface 160 may improve the aerodynamics of the structure 150 in the area proximate the seal assembly 206.

Referring still to FIGS. 29-30, the seal side edges 230 of the seal body 208 in the flush configuration 212 may each have a side edge drop distance 232 of a lowermost part of the seal side edges 230 when the seal body 208 is in the installed state 204 (i.e., non-stressed state), relative to the vertical height of the lowermost part of the seal side edges 230 in the uninstalled state 202 (FIG. 30), similar to the above-described protruding configuration 210 of the seal body 208 shown in FIGS. 4-5. The flush configuration 212 of the seal body 208 in FIGS. 29-30 may have a transverse cross-section such that when the seal assembly 206 is in the uninstalled state 202 (FIG. 30), the opposing seal side edges 230 are located at a side edge drop distance 232 below a vertical level of the same seal side edge 230 when the seal assembly 206 is in an installed state 204 (FIG. 29). Similar to the protruding configuration 210 of the seal body 208 (FIGS. 4-5), the side edge drop distance 232 for the flush configuration 212 of the seal body 208 may result in a preload 234 (FIG. 29) of each seal side edge 230 against the structural surface 152. As described above, such a preload 234 may advantageously maintain each seal side edge 230 in constant physical contact within the corresponding panel recess 162. Such a preload 234 (FIGS. 24 and 29) may be of a magnitude that counteracts any lifting force 120 that may act on the seal body 208 such as the above-described negative aerodynamic pressure 124 illustrated in FIGS.

23-24. The preload 234 on each seal side edge 230 may maintain the seal top surface 220 in flush relation to the structural surfaces 152 on opposite sides of the seal assembly 206.

Figure 31:
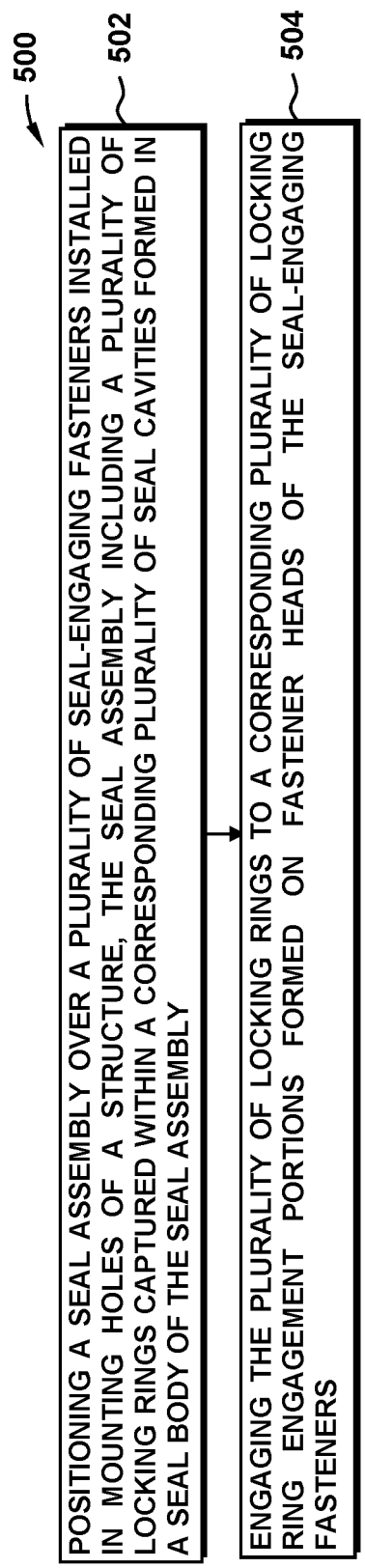
FIG. 31 is a flowchart including operations for a method of sealing a structure.
Figure 33:
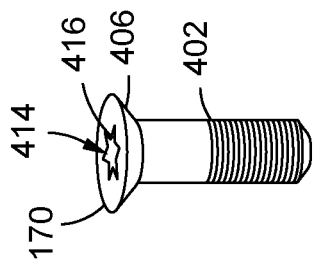
FIG. 33 is a magnified perspective view of an example of a standard fastener.
Figure 32:
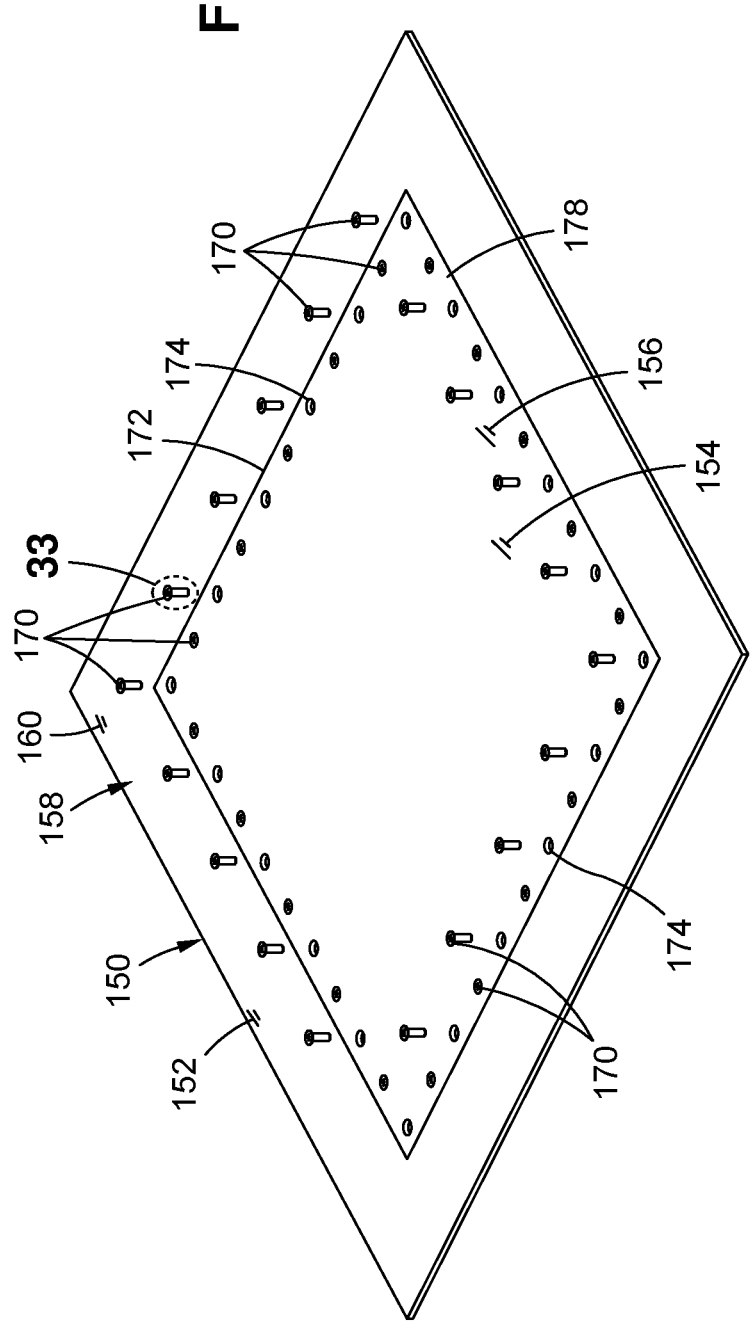
FIG. 32 is a perspective view of an access panel secured to a skin panel using a plurality of standard fasteners.

Referring now to the flow chart of FIG. 31 with additional reference to FIGS. 32-37, shown in FIG. 31 is a flowchart of a method 500 of sealing a structure 150 by securing a seal assembly 206 to a plurality of seal-engaging fasteners 400. The method 500 is described in the context of the access panel 154 shown in FIGS. 32-37. Referring to FIG. 32, shown is the access panel 154 secured to the skin panel 158 via a plurality of standard fasteners 170 (e.g., FIG. 33). The method 500 may include removing at least some of the standard fasteners 170 from the mounting holes 174 extending around the panel perimeter 178 of the access panel 154. Although FIG. 33 illustrates the standard fastener 170 as having a countersunk head 406, the fastener heads 404 of the standard fasteners 170 may have a dome head (not shown). The method 500 may include removing all of the standard fasteners 170 extending around the panel perimeter 178, or only a portion of the standard fasteners 170. For example, every other standard fastener 170 may be removed. The fastener head 404 of each standard fastener 170 may optionally include a rotational-driving feature 414 such as an internal recess 416 for engagement by a rotatable tool (not shown—e.g., a Torx™ recess for engagement by a Torx™ drive bit) for rotatably disengaging the standard fastener 170 from a threaded receptacle 176 (FIG. 5) mounted on the underside of the access panel 154 installation and removing the standard fastener 170 from the mounting hole 174.

Figure 35:
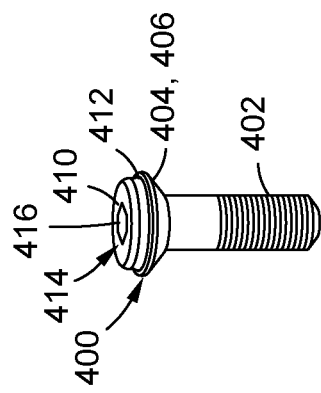
FIG. 35 is a magnified perspective view of an example of a seal-engaging fastener.
Figure 34:
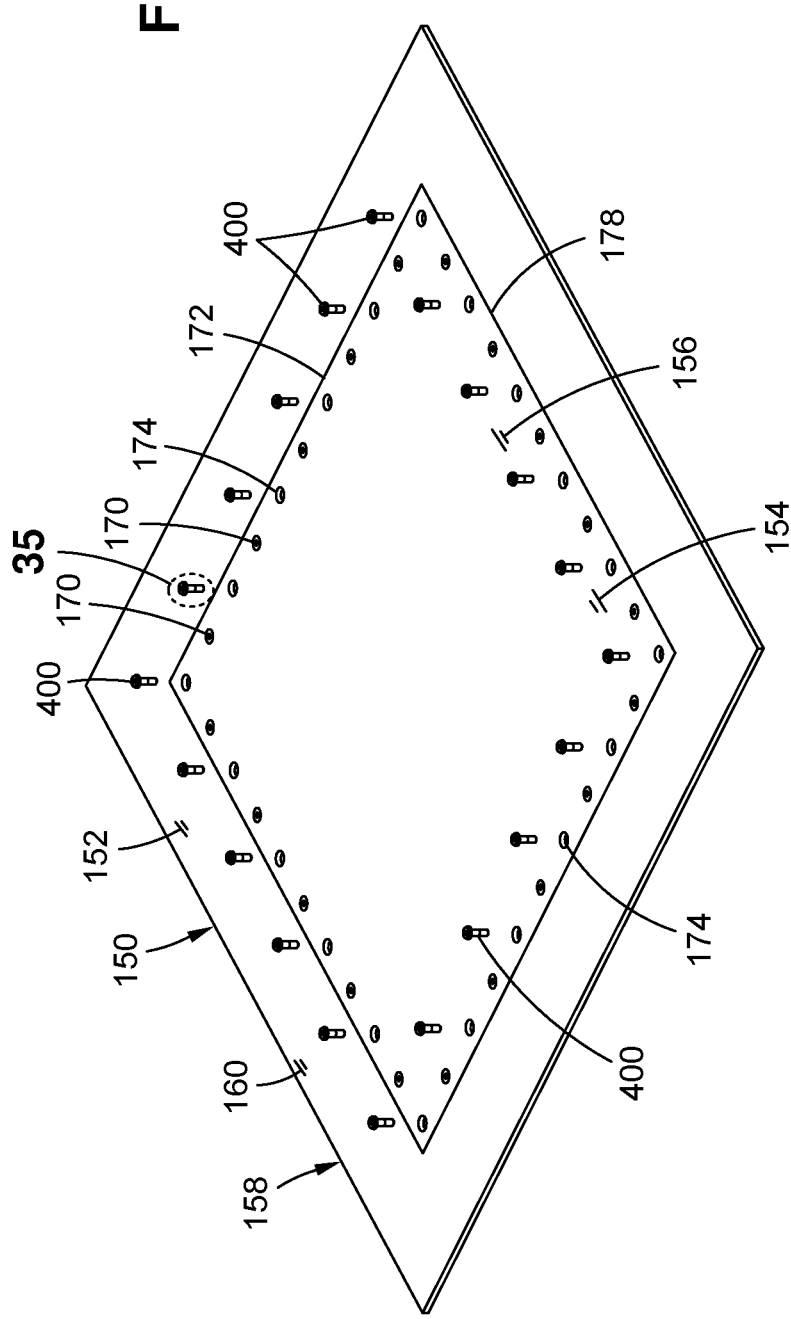
FIG. 34 is a perspective view of the access panel of FIG. 32 showing every other standard fastener replaced by a seal-engaging fastener.

Referring to FIG. 34, the method 500 may include installing seal-engaging fasteners 400 in each mounting hole 174 from which the standard fasteners 170 were removed. FIG. 35 illustrates an example of a seal-engaging fastener 400 having a countersunk head 406 to replace the countersunk head 406 standard fastener 170. As described above, the fastener head 404 of each one of the seal-engaging fasteners 400 has a locking ring engagement portion 410 which may include an annular groove 412 extending around circumference of the locking ring engagement portion 410. To simplify installation of the seal assembly 206, the fastener head 404 of each one of the seal-engaging fasteners 400 may include the same type of rotational-driving feature 414 (e.g., Torx™ recess or other type of internal recess 416) as the standard fastener 170. However, the seal-engaging fastener 400 may have a different type of rotational-driving feature 414 than the standard fastener 170 being replaced.

The method 500 may include preparing a seal assembly 206 (FIG. 7-9) for installation by inserting a plurality of locking rings 300 into a corresponding plurality of seal cavities 236 of a seal body 208. For example, the method 500 may include installing a locking ring 300 through a seal cutout 248 formed in the seal body 208 above each one of the seal cavities 236 as shown in FIG. 7. A cavity cover 250 may then be adhesively bonded into each one of the seal cutouts 248 to capture the locking rings 300 within the seal cavities 236. Referring to an alternative embodiment shown in FIG. 8, the method 500 may include inserting a locking ring 300 into each seal cavity 236 formed in a lower portion 254 of the seal body 208. After locking rings 300 are inserted in all of the seal cavities 236, an upper portion 252 of the seal body 208 may be adhesively bonded to the lower portion 254 of the seal body 208 to capture the locking rings 300 within the seal cavities 236.

Figure 36:
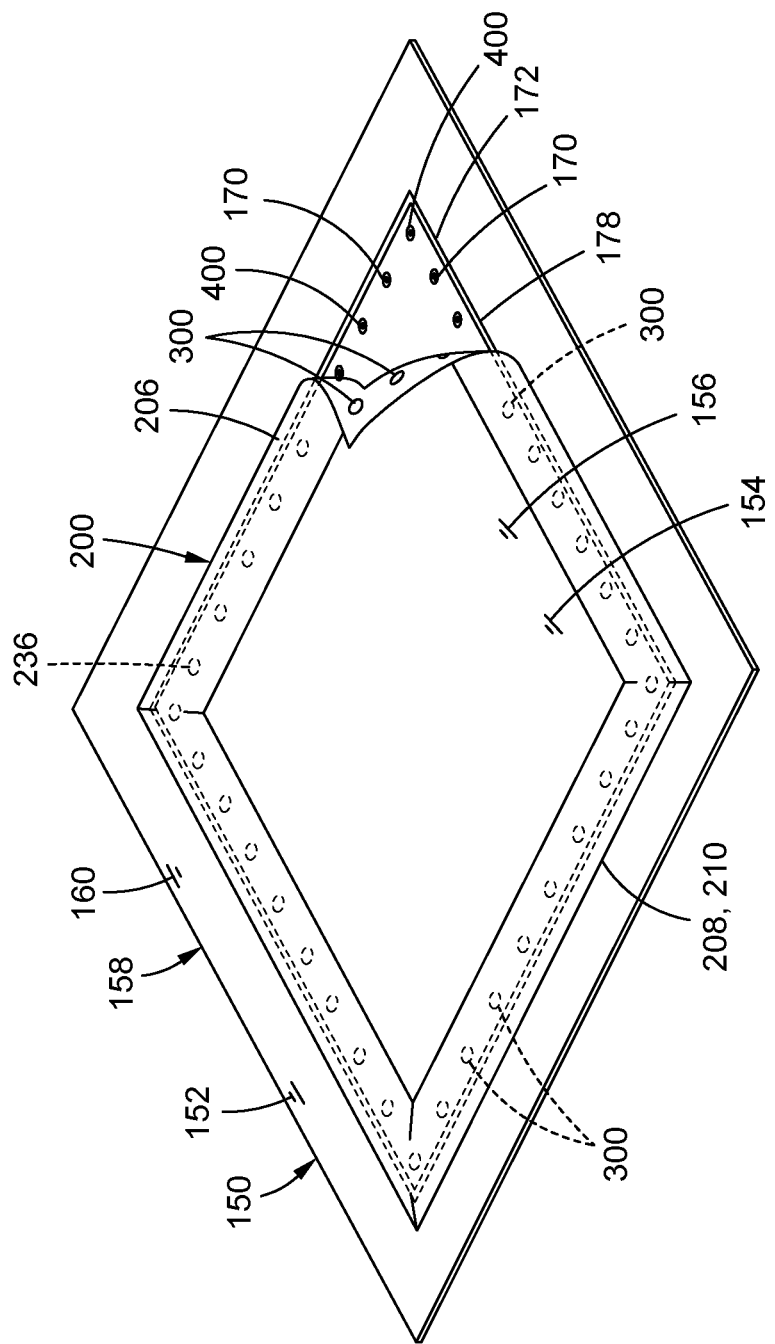
FIG. 36 is a perspective view of the access panel of FIG. 34 during engagement of a seal assembly to the seal-engaging fasteners.

Step 502 of the method 500 includes positioning the seal assembly 206 (FIG. 36) over a plurality of the seal-engaging fasteners 400 installed in mounting holes 174 of a structure 150. As mentioned above, the seal assembly 206 includes a plurality of locking rings 300 captured within a corresponding plurality of seal cavities 236 of the seal assembly 206. The step of positioning the seal assembly 206 over the plurality of seal-engaging fasteners 400 may include positioning the seal assembly 206 over the plurality of seal-engaging fasteners 400 installed in mounting holes 174 extending around a panel perimeter 178 of an access panel 154 as shown in FIG. 36. In an embodiment, the access panel 154 may be mounted to an aircraft 100, and may be secured by the seal-engaging fasteners 400 to a skin panel 158 covering an opening in the skin panel 158.

The step of positioning the seal assembly 206 over the seal-engaging fasteners 400 may include positioning a seal assembly 206 in which the seal body 208 has a protruding configuration 210 as shown in FIGS. 5 and 20. As described above, the protruding configuration 210 of the seal body 208 has a transverse cross-sectional thickness that tapers from the seal center portion 226 toward each one of opposing seal side edges 230 of the seal body 208. Alternatively, the step of positioning the seal assembly 206 over the seal-engaging fasteners 400 may include positioning a seal assembly 206 in which the seal body 208 has a flush configuration 212 as shown in FIGS. 29-30. As described above, the flush configuration 212 of the seal body 208 has a transverse cross-section that is configured complementary to at least one panel recess 162 formed in a structural surface 152 to which the seal assembly 206 is to be installed. In the context of an access panel 154, the flush configuration 212 of the seal body 208 may be configured such that when the seal assembly 206 is attached to the seal-engaging fasteners 400 as shown in FIG. 29, the seal top surface 220 is approximately flush (e.g., within 0.060 and, more preferably, within 0.030 inch) with the skin surface 160 of the skin panel 158 and with the panel surface 156 of the access panel 154.

Referring to FIG. 36, step 504 of the method 500 includes engaging the plurality of locking rings 300 of the seal assembly 206 to a corresponding plurality of locking ring engagement portions 410 included with or formed on the fastener heads 404 of the seal-engaging fasteners 400. As shown in FIGS. 12-15 and described above, each locking ring 300 has a ring body 302 with a ring inner perimeter 314 that is externally accessible via a cavity opening 244 in the seal body 208. The ring body 302 may have a radial gap 316 allowing the ring body 302 to radially expand and contract. The locking ring 300 may additionally include a plurality of tangs 322 protruding radially inwardly and (optionally) downwardly from the ring body inner diameter 310. The plurality of tangs 322 defines the ring inner perimeter 314. The step of engaging the plurality of locking rings 300 to the corresponding plurality of locking ring engagement portions 410 may include engaging the tangs 322 of at least one of the locking rings 300 with an annular groove 412 of a locking ring engagement portion 410 of a seal-engaging fastener 400, as shown in FIG. 5. The engagement of a locking ring 300 to a seal-engaging fastener 400 may include allowing the ring body 302 and ring inner perimeter 314 to radially expand as the locking ring 300 is moved axially over the locking ring engagement portion 410 of the seal-engaging fasteners 400 until the ring inner perimeter 314 radially contracts into seated engagement within the annular groove 412.

The method 500 may further include covering, using the seal body 208, a panel gap 172 in a structural surface 152 of the structure 150. For example, FIG. 36 illustrates a panel gap 172 extending around the panel perimeter 178 of the access panel 154. In the example shown, the installed seal assembly 206 covers the panel gap 172 and thereby provides a smooth aerodynamic cover for the fastener heads 404 and the panel gap 172. As mentioned above, the seal assembly 206 is not limited to installation on an access panel 154, but may be installed at any location having exposed fastener heads 404. For example, FIG. 28 shows an example of a seal assembly 206 installed on a row of seal-engaging fasteners 400 of a manufacturing joint between a pair of adjacent skin panels 158. Advantageously, the seal body 208 is sized and configured to cover the panel gap 172 extending between the pair of skin panels 158.

Referring briefly to FIGS. 23-24, the method 500 may include contacting the opposing pair of seal side edges 230 of the seal body 208 to the structural surface 152 of the structure 150 when the seal assembly 206 is engaged to the seal-engaging fasteners 400. In the seal installation shown, the seal assembly 206 may be configured such that direct physical contact between the seal body 208 and the structural surface 152 is limited to direct physical contact between the structural surface 152 and each one of the seal side edges 230, such that the remaining portion of the seal bottom surface 222 is non-contacting the structural surface 152. Further in this regard, the seal body 208 may be configured such that the step of contacting the opposing pair of seal side edges 230 to the structural surface 152 includes preloading each one of the seal side edges 230 against the structural surface 152 when the seal assembly 206 is engaged to the seal-engaging fasteners 400. As mentioned above, in the present disclosure, the preload 234 on each seal side edge 230 is along a direction approximately perpendicular to the structural surface 152.

In some examples, the step of preloading each one of the seal side edges 230 against the structural surface 152 may include preloading each one of the seal side edges 230 using a preload 234 of a magnitude that is at least as large as the magnitude of a lifting force 120 acting on the structural surface 152 and/or the seal body 208. For example, FIG. 23 illustrates a negative aerodynamic pressure 124 on a wing upper surface of a wing 106. The negative aerodynamic pressure 124 represents a lifting force 120 acting along a direction away from and approximately perpendicular to the structural surface 152. The seal body 208 may be configured such that the magnitude of the preload 234 is at least as large as the magnitude of the negative aerodynamic pressure 124 at the location of the seal assembly 206. Advantageously, the preload 234 prevents the seal side edges 230 from being lifted away from the structural surface 152 under the influence of the negative aerodynamic pressure 124, which would undesirably disrupt the flow of air over the structural surface 152, generating additional aerodynamic drag.

Figure 37:
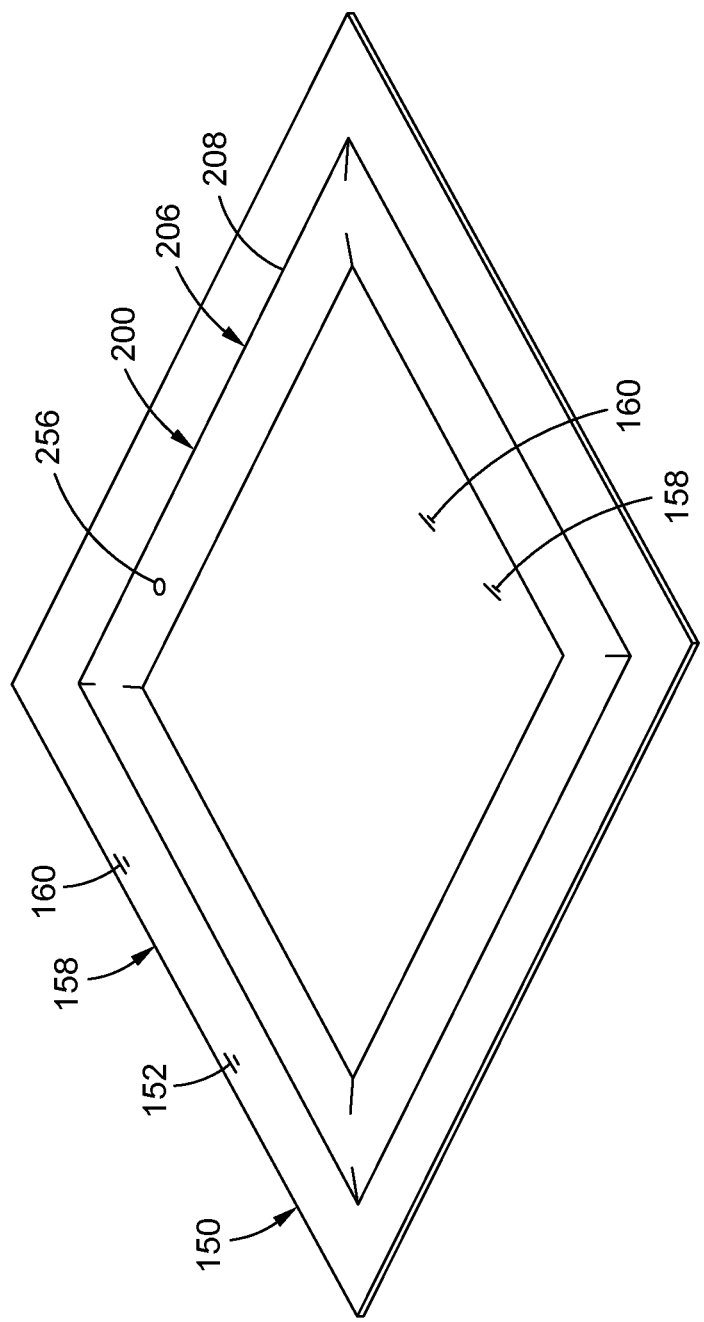
FIG. 37 is a perspective view of the access panel after completion of the seal installation and illustrating an access hole formed in the seal top surface at the location of one of the locking rings for receiving a tool for removing the seal-engaging fastener from the mounting hole.

Referring to FIG. 37, the method may also include removing the seal assembly 206 from the structure 150. For example, removal of a seal assembly 206 from an access panel 154 may be required to allow for removal of the access panel 154 in order to perform periodic maintenance on an internal system that is covered by the access panel 154. The seal system 200 may be configured such that detachment of the seal assembly 206 from a plurality of seal-engaging fasteners 400 may be manually performed by first locally disengaging one or several locking rings 300 from a corresponding number of seal-engaging fasteners 400, after which the remaining locking rings 300 may be disengaged from the remaining seal-engaging fasteners 400. Initial disengagement of one or several locking rings 300 may be facilitated by inserting a tool (e.g., a Torx™ drive bit—not shown) into an access hole 256 optionally formed in the seal top surface 220 at a location of one of the locking rings 300.

The tool inserted into the access hole may then be engaged with the rotational-driving feature 414 (e.g., a Torx™ recess) on the fastener head 404 of the seal-engaging fastener 400 to at least partially back out the seal-engaging fastener 400 from the mounting hole 174 at that location by an amount causing local lifting of the seal assembly 206 from the structure 150. The local lifting of the seal assembly 206 from the structure 150 may result in locally disengaging adjacent locking rings 300 from adjacent seal-engaging fasteners 400, after which manual force (e.g., hand force) may be used to disengage the remaining locking rings 300 from the remaining seal-engaging fasteners 400, and allowing complete removal of the seal assembly 206 from the structure 150.

Many modifications and other configurations of the disclosure will come to mind to one skilled in the art, to which this disclosure pertains, having the benefit of the teachings presented in the foregoing descriptions and the associated drawings. The configurations described herein are meant to be illustrative and are not intended to be limiting or exhaustive. Although specific terms are employed herein, they are used in a generic and descriptive sense only and not for purposes of limitation.

What is claimed is:

1. A seal assembly, comprising:
   a seal body having a seal bottom surface and a plurality of seal cavities spaced along a lengthwise direction of the seal body, the seal cavities each being open to the seal bottom surface via a cavity opening; and
   a plurality of locking rings configured to be captured respectively within a corresponding plurality of the seal cavities, each one of the locking rings comprising a ring body having a ring inner perimeter externally accessible via the cavity opening when the locking ring is captured within one of the seal cavities, each ring body configured to radially expand as the locking ring axially moves over a locking ring engagement portion of a fastener head of a seal-engaging fastener until the ring inner perimeter radially contracts into seated engagement within the locking ring engagement portion.

2. The seal assembly of claim 1, wherein:
   at least some of the locking rings include a plurality of tangs protruding radially inwardly from a ring body inner diameter and defining the ring inner perimeter, the plurality of tangs configured to engage an annular groove formed in the locking ring engagement portion of one of the seal-engaging fasteners.

3. The seal assembly of claim 1, wherein:
   the seal body has a seal center portion, opposing seal side edges, and a transverse cross-sectional thickness that tapers from the seal center portion toward each one of the seal side edges.

4. The seal assembly of claim 1, wherein:
   the seal body has a seal top surface and a transverse cross-section configured complementary to a panel recess formed in a structural surface of a structure such that when the seal assembly is attached to the seal-engaging fasteners, the seal top surface is approximately flush with the structural surface.

5. The seal assembly of claim 1, wherein:
   the seal body is electrically conductive and includes at least one of the following materials: carbon epoxy, carbon thermosets, carbon thermoplastics, metallic mesh, conductive particles embedded within polymeric material.

6. A seal system, comprising:
a plurality of seal-engaging fasteners configured to be installed in mounting holes in a structure having a structural surface, each one of the seal-engaging fasteners including a fastener head having a locking ring engagement portion;
a seal assembly, including:
a seal body having a seal bottom surface and a plurality of seal cavities spaced along a lengthwise direction of the seal body, the seal cavities each being open to the seal bottom surface via a cavity opening; and
a plurality of locking rings configured to be captured respectively within a corresponding plurality of the seal cavities, each one of the locking rings comprising a ring body having a ring inner perimeter externally accessible via the cavity opening when the locking ring is captured within one of the seal cavities, the ring body configured to radially expand as the locking ring axially moves over a locking ring engagement portion of a fastener head of a seal-engaging fastener until the ring inner perimeter radially contracts into seated engagement within the locking ring engagement portion for attaching the seal assembly to the seal-engaging fasteners.

7. The seal system of claim 6, wherein:
the seal body is configured to cover a panel gap in the structure when the seal assembly is attached to the seal-engaging fasteners;
the panel gap being defined in one of the following configurations:
between a panel perimeter of an access panel attached to the structure and a skin panel surrounding the access panel; and
between a pair of adjacent skin panels arranged in edge-to-edge relationship.

8. The seal system of claim 6, wherein:
the seal body has opposing seal side edges defining a seal body width that allows the seal body to span a panel gap defined by the structure and an access panel that is to be attached to the structure.

9. The seal system of claim 6, wherein:
at least some of the locking rings include a plurality of tangs protruding radially inwardly from a ring body inner diameter and defining the ring inner perimeter, the plurality of tangs of each locking ring configured to engage an annular groove defining the locking ring engagement portion of the seal-engaging fastener.

10. The seal system of claim 6, wherein:
the seal body has opposing seal side edges and is configured such that when the seal assembly is attached to the seal-engaging fasteners, contact between the seal body and the structural surface is limited to contact with the structural surface at the seal side edges.

11. The seal system of claim 10, wherein:
the seal body has opposing seal side edges and is configured such that when the seal assembly is in an uninstalled state, at least one of the seal side edges is located at a side edge drop distance below a level of the same seal side edge when the seal assembly is attached to the seal-engaging fasteners in an installed state, the side edge drop distance resulting in a preload of the seal side edge against the structural surface for maintaining each seal side edge in physical contact with the structural surface.

12. The seal system of claim 11, wherein:
the seal body is configured such that when the seal assembly is in the installed state, the preload on each seal side edge is at least as large as a lifting force on the seal body.

13. The seal system of claim 12, wherein:
the structure is an aircraft structure having an aerodynamic surface; and
the lifting force on the seal body is caused by negative aerodynamic pressure on the aerodynamic surface when air flows over the aerodynamic surface.

14. The seal system of claim 6, wherein:
the seal body has a seal center portion, opposing seal side edges, and a transverse cross-sectional thickness that tapers from the seal center portion toward each one of the seal side edges.

15. The seal system of claim 6, wherein:
the seal body has a seal top surface and a transverse cross-section including seal side portions configured complementary to at least one panel recess formed in the structural surface such that when the seal assembly is attached to the seal-engaging fasteners, at least one of the seal side portions is nested within the panel recess and the seal top surface is approximately flush with the structural surface.

16. A method of sealing a structure, comprising:
positioning a seal assembly over a plurality of seal-engaging fasteners installed in mounting holes of a structure having a structural surface, the seal assembly including a plurality of locking rings captured in a corresponding plurality of seal cavities formed in a seal body of the seal assembly; and
radially expanding each locking ring while axially moving each locking ring over a locking ring engagement portion of a fastener head of one of the plurality of seal-engaging fasteners until a ring inner perimeter of the locking ring radially contracts into seated engagement within the locking ring engagement portion.

17. The method of claim 16, further including:
covering, using the seal body, a panel gap in a structural surface of the structure when the seal assembly is attached to the seal-engaging fasteners.

18. The method of claim 16, wherein the step of radially expanding each locking ring while axially moving each locking ring over a locking ring engagement portion comprises:
engaging a plurality of tangs of at least one of the locking rings with an annular groove of the locking ring engagement portion of one of the seal-engaging fasteners.

19. The method of claim 16, further including:
contacting an opposing pair of seal side edges of the seal body to the structural surface of the structure when the seal assembly is attached to the seal-engaging fasteners.

20. The method of claim 16, wherein the step of contacting an opposing pair of seal side edges of the seal body to the structural surface comprises:
preloading each one of the seal side edges against the structural surface when the seal assembly is attached to the seal-engaging fasteners.

21. The method of claim 20, wherein the step of preloading each one of the seal side edges against the structural surface comprises:
preloading each one of the seal side edges using a preload of a magnitude that is at least as large as a lifting force on the seal body caused by negative aerodynamic pressure on the structural surface.

* * * * *